United States Patent [19]

Motoyama et al.

[11] Patent Number: 5,506,985
[45] Date of Patent: Apr. 9, 1996

[54] METHOD AND APPARATUS FOR FORMAT CONVERSION OF A HIERARCHICALLY STRUCTURED PAGE DESCRIPTION LANGUAGE DOCUMENT

[75] Inventors: Tetsuro Motoyama, San Jose; Satwinder S. Mangat, Santa Clara; Donny Tsay, San Jose, all of Calif.

[73] Assignees: Ricoh Company, Ltd., Tokyo, Japan; Ricoh Corporation, San Jose, Calif.

[21] Appl. No.: 208,466

[22] Filed: Mar. 9, 1994

Related U.S. Application Data

[63] Continuation-in-part of Ser. No. 147,603, Nov. 4, 1993, Ser. No. 66,383, May 21, 1993, Pat. No. 5,436,627, and Ser. No. 6,416, Jan. 19, 1993, Pat. No. 5,438,650, each is a continuation-in-part of Ser. No.931,808, Aug. 11, 1992, Pat. No. 5,416,896, which is a continuation-in-part of Ser. No. 876,601, Apr. 30, 1992, Pat. No. 5,319,748, Ser. No. 876,251, Apr. 30, 1992, Pat. No. 5,325,484, and Ser. No. 778,578, Oct. 17, 1991, Pat. No. 5,353,388.

[51] Int. Cl.⁶ ................................... G06F 17/30
[52] U.S. Cl. .................. 395/600; 395/144; 364/260.4; 364/283.1; 364/DIG. 1
[58] Field of Search .................... 395/600, 425, 395/144, 145, 146, 147, 148; 364/419

[56] References Cited

U.S. PATENT DOCUMENTS

| | | | |
|---|---|---|---|
| 4,751,740 | 6/1988 | Wright | 382/1 |
| 4,951,196 | 8/1990 | Jackson | 364/401 |
| 4,994,998 | 2/1991 | Anezaki | 364/DIG. 2 |
| 5,021,995 | 6/1991 | Quint et al. | 395/600 |
| 5,119,465 | 6/1992 | Jack et al. | 395/500 |
| 5,173,853 | 12/1992 | Kelly et al. | 364/419.1 |

OTHER PUBLICATIONS

Simone, Luisa "Vector File Conversion Utilities" PC Magazine, vol. 10, No. 2, p. 243 (11), Jan. 29, 1991.
Whitney, G. "The Write Stuff—The Ultimate Word Processor?" Interface Age, vol. 9, No. 11, pp. 74–75, 1984.
Wasson, G. "MacLink Plus/Translators" Mac User, vol. 7, No. 7, p. 78(3), Jul. 1991.
Hancock, B. "DEC's New Compound Document Architecture" DEC Professional, vol. 8, No. 4, p. 94(5), Apr. 1989.
ISO/IEC DIS 10180, Information Processing–Text Communication–Standard Page Description Language; Draft International Standard 1991–03, 1991.

*Primary Examiner*—Thomas G. Black
*Assistant Examiner*—Peter Y. Wang
*Attorney, Agent, or Firm*—Oblon, Spivak, McClelland, Maier & Neustadt

[57] ABSTRACT

A method and apparatus for conversion of a document from one format to another format. The invention inputs a binary file and determines the cleartext name for each ASN.1 tag in the binary file. An element table is used to store the features of each element and the sub-elements which are permitted to appear under each element are stored in sub-element linked list data structures referred to by the element table. It is possible for the binary encoding to be in an indefinite or definite length format and an element stack is used to keep track of the length of the binary file. The element stack is also used to keep track of the elements which are being processed in the hierarchy of the document. After a binary element is converted, the information pertaining to the cleartext representation of the binary element is stored in a double linked list data structure which refers to a previous element and a next element. After the entire file has been converted, the information stored in the double linked list data structure is written to an output file.

15 Claims, 29 Drawing Sheets

```
1    IDENTIFIER      1 BYTE
2    LENGTH     400    2 BYTES DEFINITE
3    CONTENTS (400 BYTES CONTENTS)
4            IDENTIFIER         2 BYTES
5            LENGTH             1 BYTE INDEFINITE
6            CONTENTS
7                    IDENTIFIER       1 BYTE
8                    LENGTH    248    2 BYTES DEFINITE
9                    CONTENTS (248 BYTES CONTENTS)
10                   IDENTIFIER       1 BYTE
11                   LENGTH    40     1 BYTE DEFINITE
12                   CONTENTS (40 BYTES CONTENTS)
13           0000H
14           IDENTIFIER         1 BYTE
15           LENGTH    100      1 BYTE DEFINITE
16           CONTENTS (100 BYTES CONTENTS)
17   IDENTIFIER      1 BYTE
18   LENGTH     250   1 BYTE DEFINITE
19   CONTENTS (250 BYTES CONTENTS)
```

```
<!DOCTYPE SPDL PUBLIC "ISO/IEC 10180//DTD SPDL Instance//EN">
<SPDL>
<document>
    <pageset spdlid = "ISO/IEC 10180//SPDL">
        <comment>spdlid = Public Object ID value</comment>
      <psbody>
          <picture spdlid="ISO/IEC 10180//SPDL"
                  cntnttyp="ISO/IEC 10180//ContentType/SPDLClearText">
              <comment> Public Object ID</comment>
          </picture>
           <picture spdlid="ISO/IEC 10180//SPDL"
                   cntnttype="ISO/IEC 10180//ContentType/SPDLClearText">
           </picture>
        </psbody>
    </pageset>
</document>
</SPDL>
```

*FIG. 5B*

FIG. 6 pageset: 61  length: 59  spldid: 06  length: 04  ISO/IEC 10180//SPDL: 28 CF 44 00 comment: 44  length: 1F  s: 73  p: 70  d: 64  l: 63  i: 69  d: 64  space: 20  =; 3D space: 20

P: 50  u:75  b:62  l:6C  i:69  c:63  space:20  O: 4F  b:62  j: 6A  e:65 c: 63  t:74  space:20  l: 49  D:44  space:20  v: 76  a:61  l: 6C  u:75  e:65 psbody: A1  length: 30  picture: 62  length: 1F  spdlid: 06  length: 04

ISO/IEC 10180//SPDL: 28 CF 44 00  cntnttyp: 80  length: 05

ISO/IEC 10180//ContentType/SPDLBinary: 28 CF 44 01 00  comment: 44  length:10

Public Object ID: 50 75 62 6C 69 63 20 4F 62 6A 65 63 74 20 49 44 picture: 62  length: 0D  spdlid: 06  length: 04  ISO/IEC 10180//SPDL: 28 CF 44 00 cntnttyp: 80  length:05  ISO/IEC 10180//ContentType/SPDLBinary: 28 CF 44 01 00

FIG. 7

APPLICATION TABLE

| ASN.1 TAG (BYTE VALUE) | APPLICATION ELEMENT NAME |
|---|---|
| 40H | NAME |
| 43H | TOKENSEQ |
| 44H | COMMENT |
| 45H | EXTID |
| 61H | PAGESET |
| 62H | PICTURE |
| 66H | RESDEF |
| ⋮ | ⋮ |

ELEMENT TABLE

| ELEMENT NAME | START TAG | END TAG | PRIMITIVE OR CONSTRUCTED TAG | ELEMENT DECLARATION | No. OF ATTRIBUTES | No. OF SUB-ELEMENTS | POINTER TO SUB-ELEMENT LINKED LIST |
|---|---|---|---|---|---|---|---|
| PAGESET | — | 0 | CONS | IMPLICIT SEQUENCE | 1 | 2 | ↗ |
| PICTURE | — | 0 | CONS | IMPLICIT SEQUENCE | 2 | 2 | ↗ |
| PSBODY | — | — | CONS | IMPLICIT SEQUENCE OF CHOICE | 0 | 2 | ↗ |
| PICBODY | — | — | CONS | IMPLICIT SEQUENCE OF CHOICE | 0 | 2 | ↗ |

*FIG. 8*

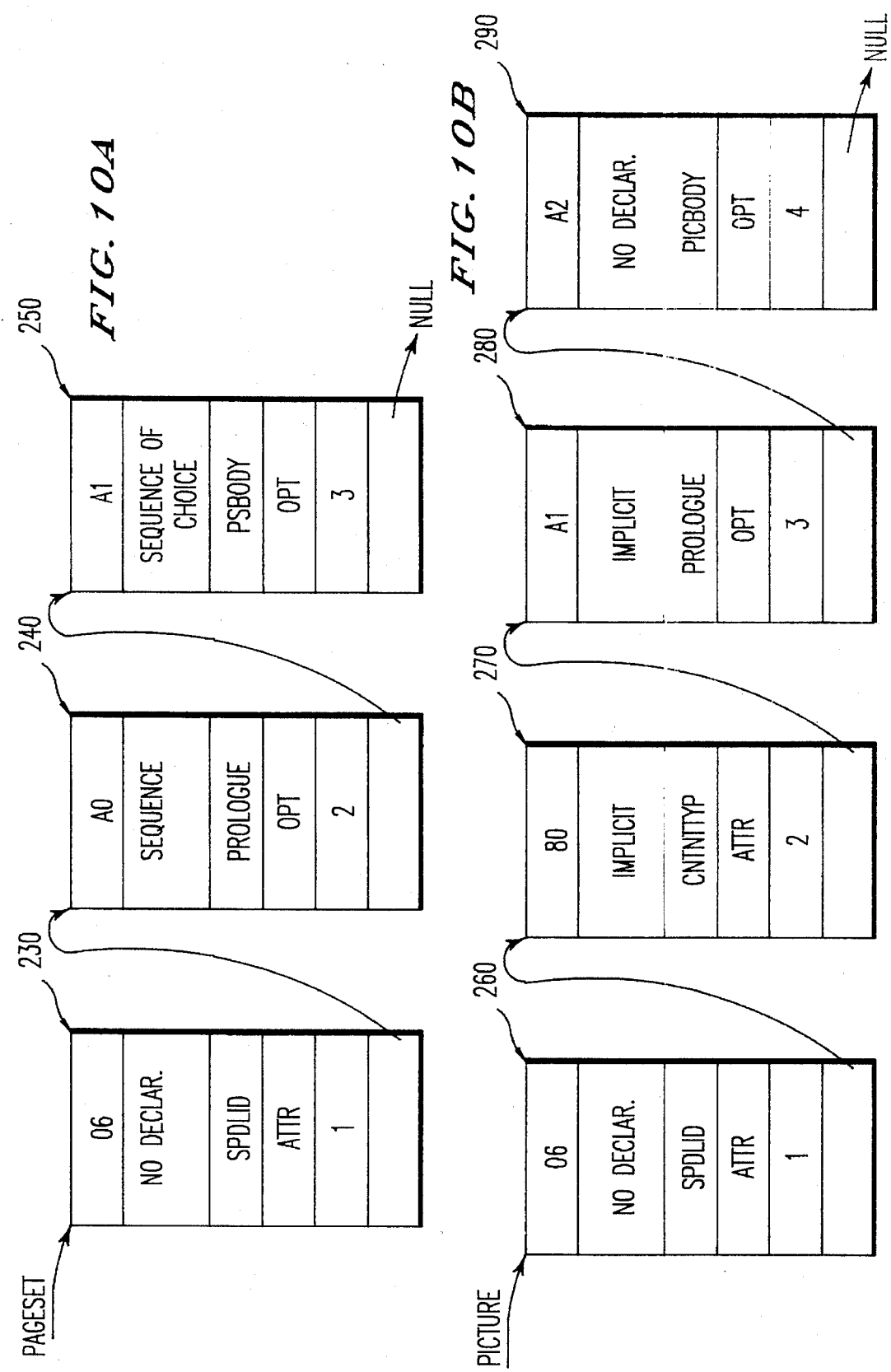

| ELEMENT NAME | ELEMENT DECLARATION | NUMBER OF ATTRIBUTES | LEVEL NUMBER | INDEF FLAG | ELEMENT LENGTH | POINTER |
|---|---|---|---|---|---|---|
| PICTURE | IMP. SEQ. | 2 | 3 | 0 | 1FH | |
| PSBODY | IMP. SEQ. OF CHO. | 0 | 2 | 0 | 30H | |
| PAGESET | IMP. SEQ. | 0 | 1 | 0 | 0 H | |

*FIG. 16C*

| ELEMENT NAME | ELEMENT DECLARATION | NUMBER OF ATTRIBUTES | LEVEL NUMBER | INDEF FLAG | ELEMENT LENGTH | POINTER |
|---|---|---|---|---|---|---|
| PSBODY | IMP. SEQ. OF CHO. | 0 | 2 | 0 | 0FH | |
| PAGESET | IMP. SEQ. | 0 | 1 | 0 | 0 H | |

*FIG. 16D*

SUB-ELEMENT LINKED LIST

METHOD AND APPARATUS FOR FORMAT CONVERSION OF A HIERARCHICALLY STRUCTURED PAGE DESCRIPTION LANGUAGE DOCUMENT

CROSS REFERENCES TO RELATED APPLICATIONS

This application is a continuation-in-part of U.S. patent application Ser. No. 08/147,603 filed on Nov. 4, 1993 and entitled "STANDARD PAGE DESCRIPTION LANGUAGE CLEARTEXT STRUCTURE GENERATOR", now pending, U.S. patent application Ser. No. 08/066,383 filed May 21, 1993 and entitled "METHOD AND SYSTEM FOR PROCESSING MIXED BINARY LENGTH ENCODINGS CONTAINING DEFINITE AND INDEFINITE LENGTH FORMATS", now U.S. Pat. No. 5,436,627, and U.S. patent application Ser. No. 08/006,416 filed Jan. 19, 1993 and entitled "METHOD AND SYSTEM TO RECOGNIZE ENCODING TYPE IN DOCUMENT PROCESSING LANGUAGE", now U.S. Pat. No. 5,438,650, each of which is a continuation-in-part of U.S. patent application Ser. No., 07/931,808 filed on Aug. 11, 1992 and entitled "A Method And System to Handle Dictionary Generation and Context Declaration in a Document Processing Language", now U.S. Pat. No. 5,416,896, which is a continuation-in-part of U.S. patent application Ser. Nos. 07/876,601, now U.S. Pat. No. 5,319,748, and 07/876,251, now U.S. Pat. No. 5,325,484 both filed on Apr. 30, 1992 and entitled "Method and Apparatus to Manage Picture and Pageset for Document Processing" and "Method and System to Handle Inclusion of External Files into a Document Processing Language," respectively, and a continuation-in-part of U.S. patent application Ser. No. 07/778,578 filed Oct. 17, 1991 and entitled "System and Method for Document Processing", now U.S. Pat. No. 5,353,388, each of which is incorporated herein by reference.

BACKGROUND OF THE INVENTION

1. Field of the Invention

This invention is directed towards a method and apparatus for converting the format of a document. This invention is more particularly related to a method and apparatus for conversion of a binary encoded document to a cleartext encoded document. This invention is even more related to the conversion of a binary encoded Standard Page Description Language document to a cleartext encoded Standard Page Description Language document.

2. Discussion of the Background

A standardized page description language has been proposed and is being developed as an international standard by the International Organization for Standardization ("ISO"). The proposal, to which one of the inventors is a contributor, is currently in draft form before a section of the ISO. The draft is known as ISO/IEC DIS 10180, labeled "INFORMATION PROCESSING-TEXT COMMUNICATION-STANDARD PAGE DESCRIPTION LANGUAGE" and is available at the American National Standards Institute ("ANSI") in New York and incorporated herein by reference.

Standard Page Description Language ("SPDL") is a hierarchically structured page description language. This structured hierarchy allows a portion of a document to be printed without tracing through the entire document for formatting commands which may affect the particular portion being printed. Only the portion of the document which is hierarchically above the portion being printed needs to be processed to print the desired portion.

An additional advantage of SPDL is that it conforms to the Standard Generalized Markup Language ("SGML") as defined in ISO 8879:1986. This allows the structure of documents to be described and tagged in a generic fashion. Once tagged in SGML, files can travel seamlessly from one platform to another without the use of conversion utilities and without the loss of structural formatting.

SPDL conforms to the Basic Encoding Rules set forth in ASN.1. A complete description of ASN.1 can be found in "ASN.1, The Tutorial and Reference," by Douglas Steedman, 1990, which is incorporated herein by reference.

A cleartext language is a type of computer language which is human readable. An example of a non-cleartext language would be a binary encoding of a document as a human could not readily understand the contents of the document by looking at the binary or hexadecimal representation of the document. A primary advantage of a binary encoded document includes the fact that the binary represented document consumes much less storage space than the equivalent cleartext format document. This allows for a smaller storage space of the binary document and a faster transmittal time of the binary document. However, the editing and understanding of a binary encoded document is difficult without the use of special software as compared to a cleartext encoded document.

Therefore, as described above there are advantages and disadvantages to both the cleartext encoding and binary encoding of a document and it may be desirable to convert a document from one format to another.

SUMMARY OF THE INVENTION

It is an object of this invention to provide a method and apparatus to convert a binary encoded document to a cleartext encoded document.

It is another object of this invention to provide a method and apparatus to convert a binary encoded Standard Page Description Language document to an equivalent cleartext encoded Standard Page Description Language document.

Because of the format required in a binary SPDL document, it is not possible to perform a simple look-up procedure to convert a binary encoded document to a cleartext encoded document. The representation of the various binary symbols depends upon the location of the binary symbols in the SPDL document. Another problem which the present invention must deal with is keeping track of the length of each of the binary encoded processes. SPDL is a hierarchically structured page description language and the beginning of each hierarchical level indicates whether the level is encoded in a definite or indefinite length format and the length of the encoding when there is a definite length binary encoding. A further problem which the present invention deals with is that the order of certain elements in a binary encoding must be changed in the cleartext encoding. Therefore, it is necessary to know the required encoding order in the cleartext SPDL format.

The present invention performs the binary to cleartext conversion by first looking up the ASN.1 tag in an application table to determine the cleartext name of the binary tag. Once the cleartext name is determined, further information pertaining to the element can be looked up in an element table. The elements of the element table can have sub-elements which are referred to by a pointer in the element table which points to a sub-element linked list.

After the necessary information about an element is obtained, an entry is pushed onto an element stack which contains various fields for keeping track of the information used in the conversion process. The element stack is very beneficial in processing the definite and indefinite length formats of the binary encodings.

As the binary elements are being converted, attribute values are stored in an attribute buffer. Before the output file is generated, as the file is being converted, each converted cleartext line is written into a double linked list data structure. After the entire file has been converted and written into the double linked list data structures, the information from the double linked list data structures is written to an output file.

The double linked list data structure is advantageously used for processing out of order attributes. An element can contain attributes and sub-elements. Ordinarily, and for cleartext SPDL, the attributes must appear immediately after the element and before the occurrence of any sub-elements. However, in binary SPDL encoding, the sub-elements can appear before the attributes.

The present invention solves the above described problem of out of order attributes using an attribute buffer and the double linked list data structure. The objects which appear hierarchically below elements in the present invention are generically referred to as sub-elements. The sub-elements to an element are either attributes of the element or actual sub-elements. For attributes to be in order, they should appear immediately after the element. If sub-elements appear after the element before all of the attributes appear, the later attributes are considered out of order attributes. The double linked list data structure has an entry for storing the attribute information of the element. If non-attribute sub-elements appear under an element before all of the attributes are processed, new double-linked list data structures are referred to by the double linked list data structure of the parent element. After the processing of the sub-elements of the parent element, the out of order attributes will appear. The double linked list data structures are traced back from the most recently created double linked list data structure until the double linked list data structure of the parent element is reached. Then the attribute information from the attribute sub-element is written into the attribute entry of the double linked list of the parent element. In this manner, out of order attributes can be efficiently handled.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 illustrates an example of nesting of definite and indefinite formats for a binary encoding;

FIG. 5A is a hexadecimal representation of a sample binary encoded SPDL document;

FIG. 5B is a cleartext representation of the binary document illustrated in FIG. 5A;

FIG. 6 is an illustration of the correspondence between the binary and cleartext elements illustrated in FIGS. 5A and 5B;

FIG. 7 is an application table illustrating ASN.1 tags and the corresponding cleartext elements;

FIG. 8 illustrates the element table used for storing information pertaining to SPDL structure elements;

FIGS. 10A–10D illustrate sample sub-element linked list data structures which are pointed to by the element table illustrated in FIG. 8;

FIGS. 16A–16E illustrate the status of the element stack as the document illustrated in FIG. 5A is being converted.

DESCRIPTION OF THE PREFERRED EMBODIMENTS

Figure 2:
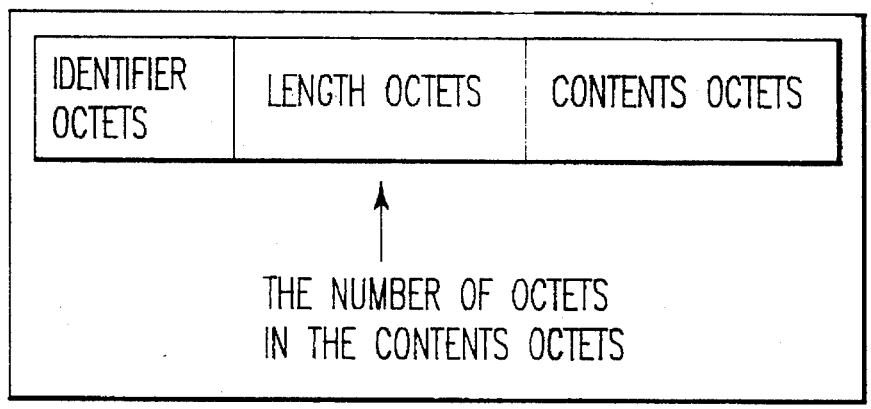
FIG. 2 illustrates the structure of an encoding according to ISO/IEC 8825.

Referring now to the drawings, wherein like reference numerals designate identical or corresponding parts throughout the several views, and more particularly to FIG. 1 thereof, there is illustrated an example of nesting of definite length and indefinite length formats for a binary encoded document. FIG. 1 can be considered to illustrate a data stream or document data stream which is to be processed. Lines 1–16 and lines 17–19 are two encodings at the highest hierarchial level, although there are nested encodings within lines 1–16. The contents of the encoding of lines 1–16 is of a definite length of 400 bytes. Within those 400 bytes, first there is an indefinite length structure at lines 4–13. Within the indefinite length contents of lines 4–13 are definite length encodings of 248 bytes and 40 bytes. In addition to the indefinite length encoding at lines 4–13 of the 400 bytes of content, there is a definite length encoding at lines 14–16 containing 100 bytes of contents. Lines 17–19 of FIG. 1 contain a definite length encoding of 250 bytes in length.

The term "nesting of definite length and indefinite length formats" means that an indefinite length encoding can have as its content both an indefinite and a definite length encoding or a combination of these two encodings. This means that the definite length encoding begins before the indefinite length ends. The above term is similarly applicable to a definite length encoding containing an indefinite length encoding therein. That is, an indefinite length encoding can begin before a definite length encoding ends. Further, there can be any number of encodings of any type nested within an encoding.

As an encoding such as that illustrated in FIG. 1 is being processed, a problem exists with the handling of the nested definite and indefinite length encodings. The example illustrated in FIG. 1 is a simple case. It is possible for the definite and indefinite format nesting to be much deeper. Therefore, the processing system may have to keep track of the nesting of many indefinite length format and definite length format hierarchical levels.

To determine the end of an indefinite length encoding, more is required than looking for the end of the indefinite encoding flag or marker such as 0000H of line 13 which is used in ASN.1 encoding. This is because the contents at lines 9 and 12 can contain 0000H as data, for example, as image data. Therefore, the present invention operates to look for the end of the indefinite length encoding, 0000H, after nested definite length encodings have been processed as the end of the indefinite encoding must come after definite length format nested routines.

Turning now to the encoding required by ASN.1, FIG. 2 illustrates the structure of a binary encoding according to the Basic Encoding Rules as defined in ISO/IEC 8824. The encoding begins with one or more identifier octets, one or more length octets, followed by the contents octets.

Figure 3:
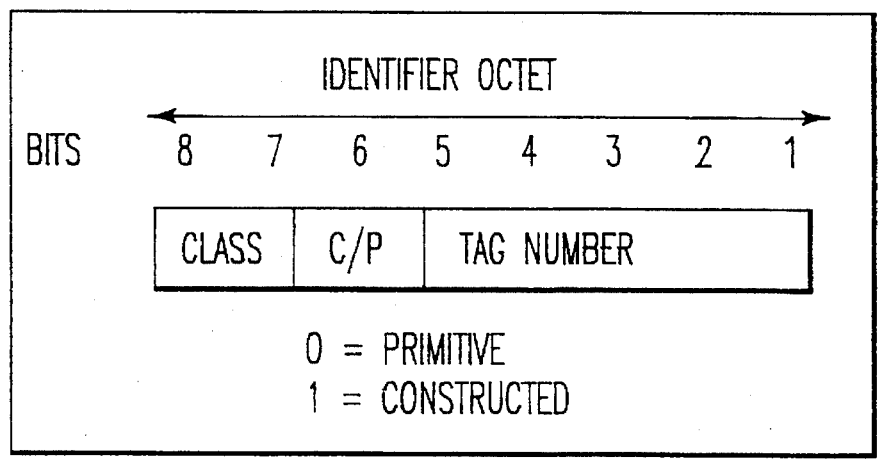
FIG. 3 illustrates the structure of an identifier octet according to ISO/IEC 8825.

The structure of an identifier octet defined by ISO/IEC 8825 is illustrated in FIG. 3. The first two bits of the identifier octet sets forth the class of the encoding. The four possible classes of the encoding defined by bits 8 and 7 illustrated in FIG. 3 are universal, application, context-specific, and private. A complete description of encoding under ASN.1 can be found in ISO/IEC 8824 and 8825, each of which is incorporated herein by reference. However, an understanding of the operation of the present invention does not require an understanding of the different classes of encodings and a more detailed description is omitted for clarity.

Bit 6, illustrated in FIG. 3, determines whether an encoding is primitive or constructed. Primitive means there are no further encodings nested within the present encoding and constructed means that there are further encodings within the present encoding. Bits 5-1 illustrated in FIG. 3 pertain to the number of the tag. If the number of the tag is greater than 31, bits 5-1 are not sufficient to represent the number and therefore, the identifier octet is set to 1111 with subsequent identifier octets encoding the number of the tag. A complete understanding of the various tag numbers is not required to understand the operation of the present invention and is therefore omitted for clarity.

The identifier and length octets can be considered preamble information and the contents octets can be considered content information. It is to be noted that when the identifier information is converted to a textual format, the resulting text information is a cleartext start tag, followed by a cleartext representation of the content information followed by a cleartext end tag, if required or desired.

The above description is believed to be sufficient for one of ordinary skill in the art to understand the principals of binary SPDL encoding. However, a more detailed and thorough explanation of processing of a binary encoding can be found in commonly owned co-pending U.S. patent application Ser. No. 08/066,383 entitled "METHOD AND SYSTEM FOR PROCESSING MIXED BINARY LENGTH ENCODINGS CONTAINING DEFINITE AN INDEFINITE LENGTH FORMATS", now U.S. Pat. No. 5,436,627. The primary concern and processing of the present application is to convert a file from a binary to cleartext representation whereas the processing described in the related applications is primarily concerned with the presentation of a document by a printer, CRT, or the like.

The present invention uses an element table and sub-element link list to keep track of the information of the various SPDL elements. SPDL is a hierarchically structured page description language and it was necessary to determine the hierarchy in SPDL to create the information in the element tables and sub-element link lists.

Figure 4:
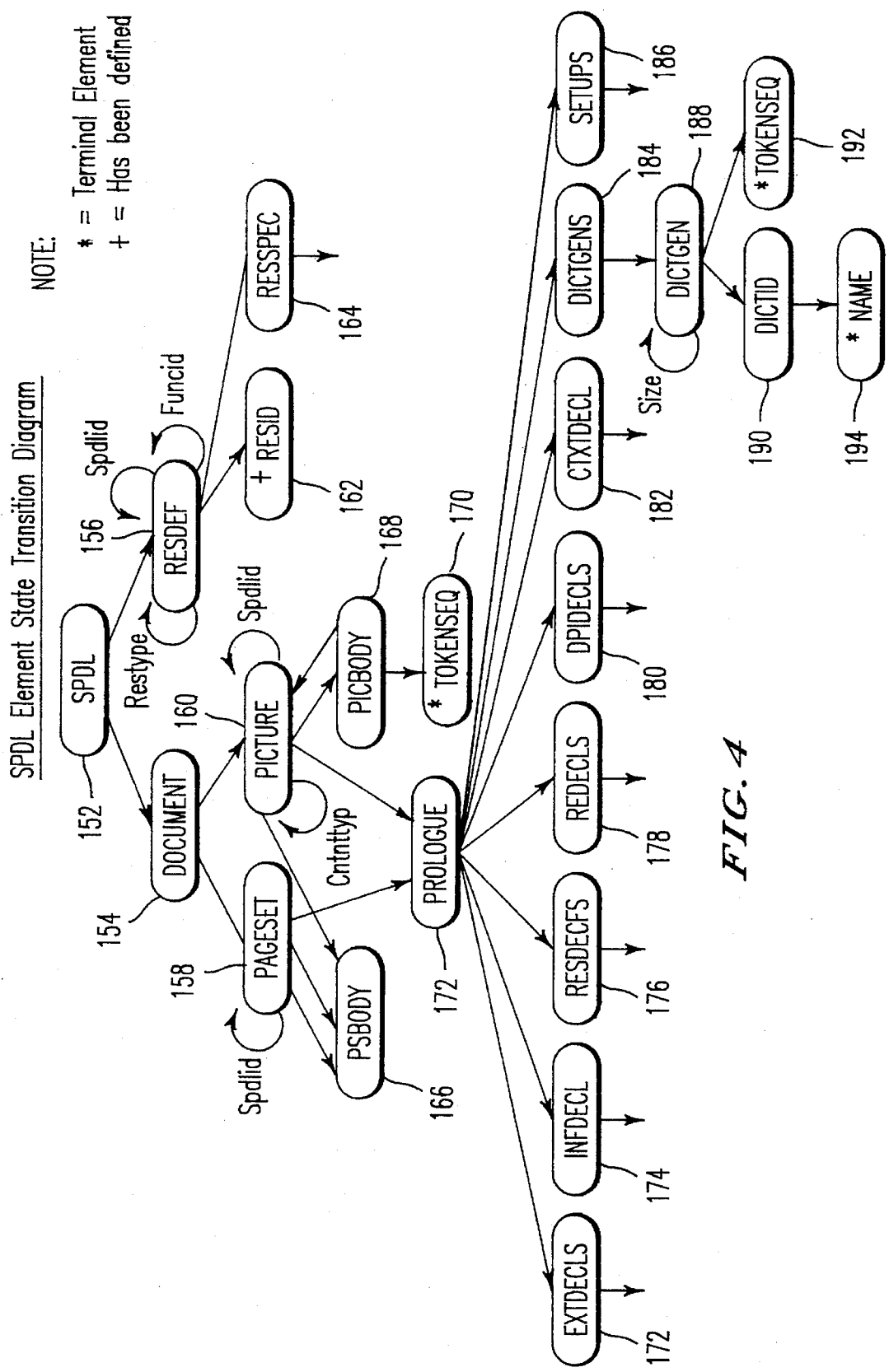
FIG. 4 is a partial illustration of an SPDL element state transition diagram.

To determine the order of the hierarchy in SPDL, the present inventors have constructed an SPDL element state transition diagram, as illustrated in FIG. 4, using the description of the SPDL elements contained in the draft standard. FIG. 4 illustrates the hierarchy of the SPDL structure elements using the tree structure contained therein and illustrates the attributes for the various SPDL elements by showing a labeled circular arrow for the attribute originating from an element and returning to that same element. From the state transition diagram, the inventors were able to create the element table and sub-element link list used by the present invention.

The first element in the transition diagram is SPDL 152. There are two possible elements which can appear under the SPDL element; the document element 154 and the resource definition element 156. The resource definition element 156 is illustrated as having attributes; the resource attribute, the SPDL ID attribute and the function ID. Attributes can have either fixed values or values input by the user.

In FIG. 4, the terminal elements or the lowest elements in a particular hierarchy have been marked with an asterisk and the elements which have been previously defined are marked with a plus sign. The terminal elements can be at the lowest level in a particular hierarchy whereas the other elements cannot. The SPDL element state transition diagram illustrated in FIG. 4 is not a complete diagram and omits some of the SPDL structure elements for clarity sake. For example, there are structure elements which appear under the resource specification 164, the external declarations 172, the informative declaration 174, the resource definitions 176, the resource declarations 178, the DPI declarations 180, the context declaration 182, and the set-up procedures 186.

Under the document structure element 154 are a pageset element 158 and a picture element 160. Under the pageset 158 are the pageset body 166 and the prologue 172. As is illustrated in FIG. 4, a picture element 160 can also appear under the pageset body 166. The picture element 160 has an attribute of the content type and the SPDL ID. SPDL elements which can appear under the picture element 160 are the prologue 172 and the picture body 168. A token sequence 170 can appear under the picture body 168. The dictionary generators 184 appearing under the prologue 172 can have the dictionary generator element 188 appearing thereunder which has an attribute of size. The SPDL structure element which can appear under the dictionary 188 are a dictionary ID 190, a name 194, and a token sequence 192.

FIG. 5A illustrates an exemplary binary SPDL document in a hexadecimal representation. The cleartext equivalent of the document illustrated in FIG. 5A is illustrated in FIG. 5B. When the present invention is operated, the document illustrated in 5A can be input and converted to the form illustrated in FIG. 5B. Details of FIGS. 5A and 5B will be better understood after the description of the operation of the invention is given with respect to documents illustrated in FIGS. 5A and 5B.

FIG. 6 illustrates how the document illustrated in FIG. 5A corresponds to the document illustrated in FIG. 5B. As can be seen from FIG. 6, 61 represents the element pageset. After 61, 59 represents the length of the pageset. Within the pageset is the SPDL ID represented by the ASN.1 tag 06. The length of the SPDL ID is 4. The actual SPDL ID which is "ISO/IEC 10180//SPDL" is represented by "28 CF 44 00".

Next in FIG. 6, it can be seen that the ASN.1 tag 44 corresponds to a comment. The length of the comment is 1F. The content of the comment is "SPDL ID =Public Object ID value". Next it is seen that A1 represents a psbody, also referred to as a pageset body. The remaining portion of FIG. 6 can be read as was done above. Therefore, a complete description of the correspondence in FIG. 6 has been omitted for brevity.

FIG. 7 illustrates an application table used by the present invention. The application table contains the byte value of the ASN.1 tags (identifier octets) and the corresponding cleartext application element name. For example, the ASN.1 tag 40H corresponds to the cleartext element "name". It can also be seen that the ASN.1 tags 61 H and 62 H correspond to the elements pageset and picture, respectively. Of course, the full application table used by the present invention will contain the known ASN.1 tags and known element names for each of the SPDL structure elements. A complete listing of each of the ASN.1 tags has not been provided as they are readily available in known documentation.

FIG. 8 illustrates the SPDL element table used by the present invention. The first column in the element table is the element name or cleartext tag of the element. The next two columns indicate whether the start tag and end tag can be omitted or are required. The hyphen indicates that the tag is required and the o indicates that the tag is optional. Note that in the disclosed embodiment of the present invention, the start tag and end tag of each element are always used. Of course, it may be possible to use the start tag and end tag entries in the element table and omit the tags when they are optional.

The fourth column in the element table indicates whether the element is primitive or constructed. Primitive means that there are no further encodings nested within the content and constructed means that there are further encodings within the content. The present invention does not make specific reference to the fourth column but the primitive/constructed information may be used by other related inventions and is therefore included in the element table.

The fifth column of the element table contains the element declaration. The element declaration is a description of the characteristics of the element. More particularly, the element declaration relates to the characteristics of the element in the Element Name and the handling of the subordinate structure elements, if any. For example, DOCTYPE, NO DECLARATION, OCTET STRING, and PRINTABLE STRING are a first type of element declaration. CHOICE, SEQUENCE, and SEQUENCE OF CHOICE are a second type of element declaration.

The DOCTYPE declaration is a special type of declaration used only for the DOCTYPE structure element. The choice declaration indicates that the user can choose any one of the sub-elements under the element. The SEQUENCE declaration indicates that the sub-elements appearing under the element must appear in a particular sequence and this sequence cannot be altered.

The SEQUENCE OF CHOICE DECLARATION repeats the choice declaration, allowing more than one subordinate structure element to be chosen. The declaration "NO DECLARATION" means that the element has only one subordinate structure element.

The OCTET STRING declaration indicates that the element is a character string of 8 bit bytes. The printable string declaration indicates that the element is a printable string.

When the declaration is implicit, this means that the declaration does not have to be expressly stated because it can be determined based on the tags appearing below. The details of this feature can be found in known publications pertaining to the encoding used by SPDL including ASN.1 encoding and are omitted for the sake of brevity.

Other declarations are used by other SPDL document types but the details of these declarations are omitted for clarity's sake. These details can be found in known publications pertaining to SPDL. The present invention can use the element declaration to ensure that the syntax of the binary SPDL document does not violate any SPDL encoding requirements.

The sixth column of the element table indicates the number of attributes of the element. An attribute describes various features of an element and the specific attributes for an element are found in the sub-element linked lists.

The seventh column of the element table indicates the number of sub-elements of the element. The number of sub-elements indicates the number of different sub-elements which can appear under the element. The last column in the element table is the pointer to the sub-element linked list data structures which contain information pertaining to the sub-elements which can appear under the element.

Figure 9:
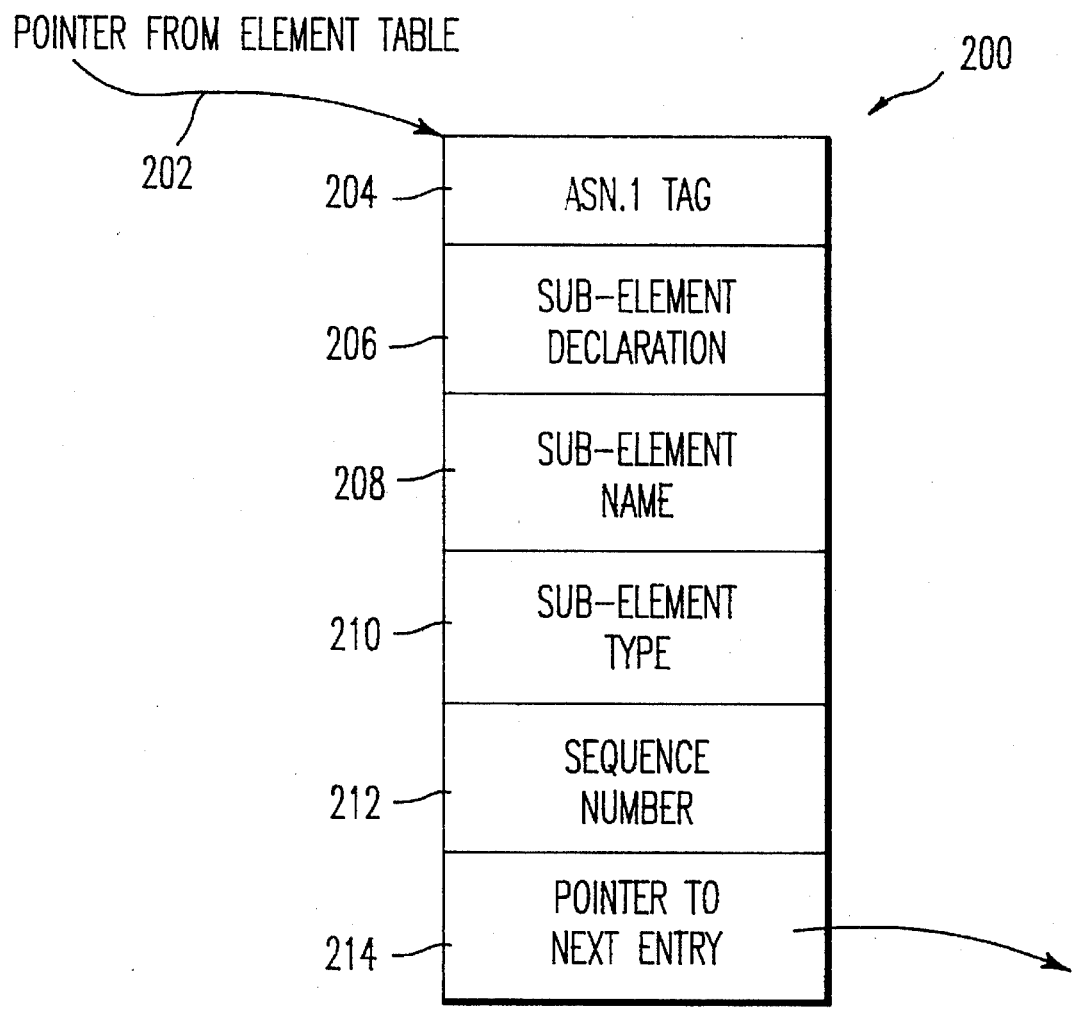
FIG. 9 is an illustration of the sub-element linked list data structure pointed to by the element table.

FIG. 9 illustrates the sub-element linked list data structure 200 which is pointed to by pointer 202 which can correspond to any of the pointers of the element table illustrated in FIG. 8. The first entry in the subelement link list data structure is the ASN.1 tag which is the binary representation of the sub-element. Entry 206 of the sub-element linked list data structure 200 is the sub-element declaration which contains declaration information similar to the element declaration described with respect to the element table.

Entry 208 of the sub-element linked list data structure contains the cleartext sub-element name corresponding to the ASN.1 tag 204.

Entry 210 contains the sub-element type. The possible types of sub-elements are an attribute, optional, default, or terminating and combinations of these four types are allowed. In actual implementation of the invention, the types of sub-elements can be represented using four bits for the four types. It is also possible for the type of sub-element to be empty if it does not fit one of the previously recited four types of sub-elements.

Field 212 contains the sequence number of the sub-element which is the number of the sub-element linked list data structure. For example, the first sub-element for a particular element has a sequence number of 1 and the linked list data structure pointed to by the first linked list data structure of a sub-element (the second sub-element) has a sequence number of 2.

The last field 214 of the sub-element linked list data structure is the pointer to the next sub-element linked list data structure. If a particular element has a number of different sub-elements appearing thereunder in the hierarchy, each sub-element will have its own linked list data structure. The sub-element linked list data structures are linked together by the pointer 214 which points to a subsequent sub-element linked list data structure of a particular element. The last sub-element linked list data structure points to null.

FIG. 10A illustrates the sub-element linked list data structures 230, 240, and 250 for the pageset element. The ASN.1 tag for the first sub-element is 06 which corresponds to the SPDL ID element. There is no declaration for the SPDL ID and the SPDL ID is an attribute. The SPDL ID is the first sub-element and points to the second sub-element which is the prologue. The prologue sub-element linked list data structure points to the PSBODY sub-element linked list data structure 250.

Figure 10C:
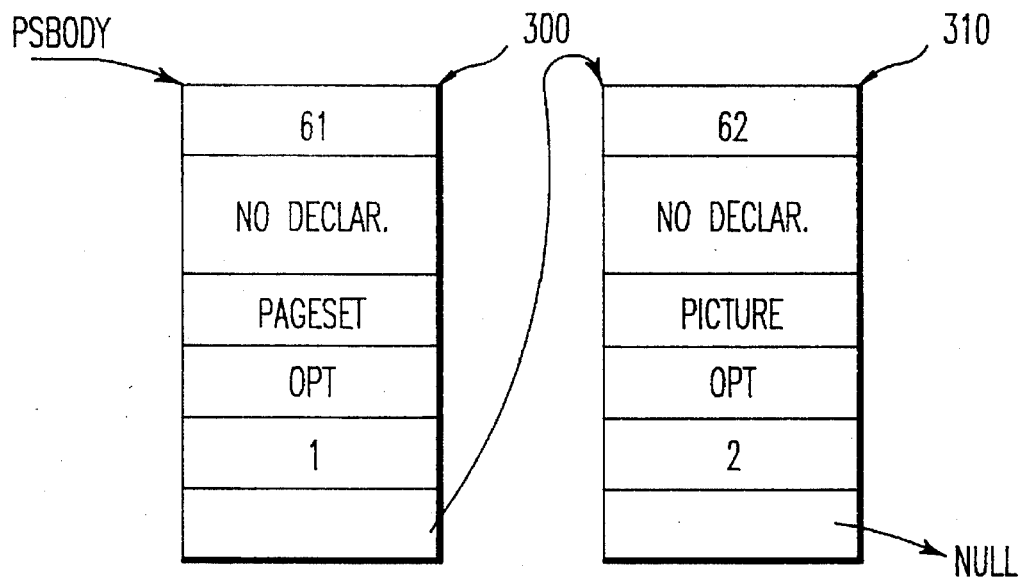
Figure 10D:
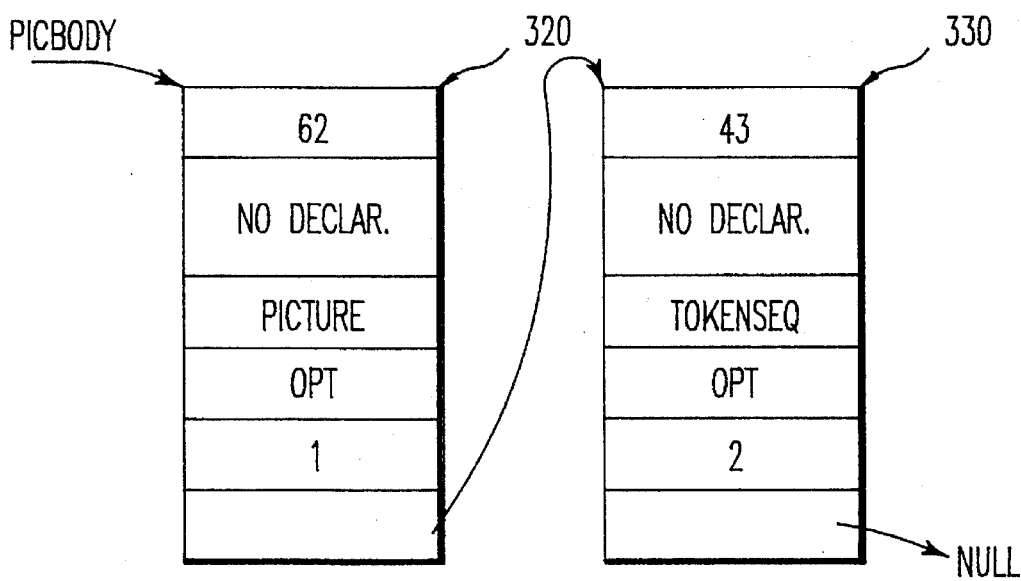

The sub-element linked list data structure for the picture element illustrated in FIG. 10B, the PSBODY element illustrated in FIG. 10C, and the PICBODY element illustrated in FIG. 10D have fields which can be described in a similar manner as the fields in the linked list data structures described with respect to the pageset element.

At the time of this writing, the SPDL standard is in draft form and not yet finalized. It may be necessary in the future to include a "flag" entry in the sub-element linked list data structure which is used when the element or sub-element declaration is a sequence. However, this flag is not included in the illustrated sub-element linked list data structure because at the time of this writing, it is not necessary.

Figure 11:
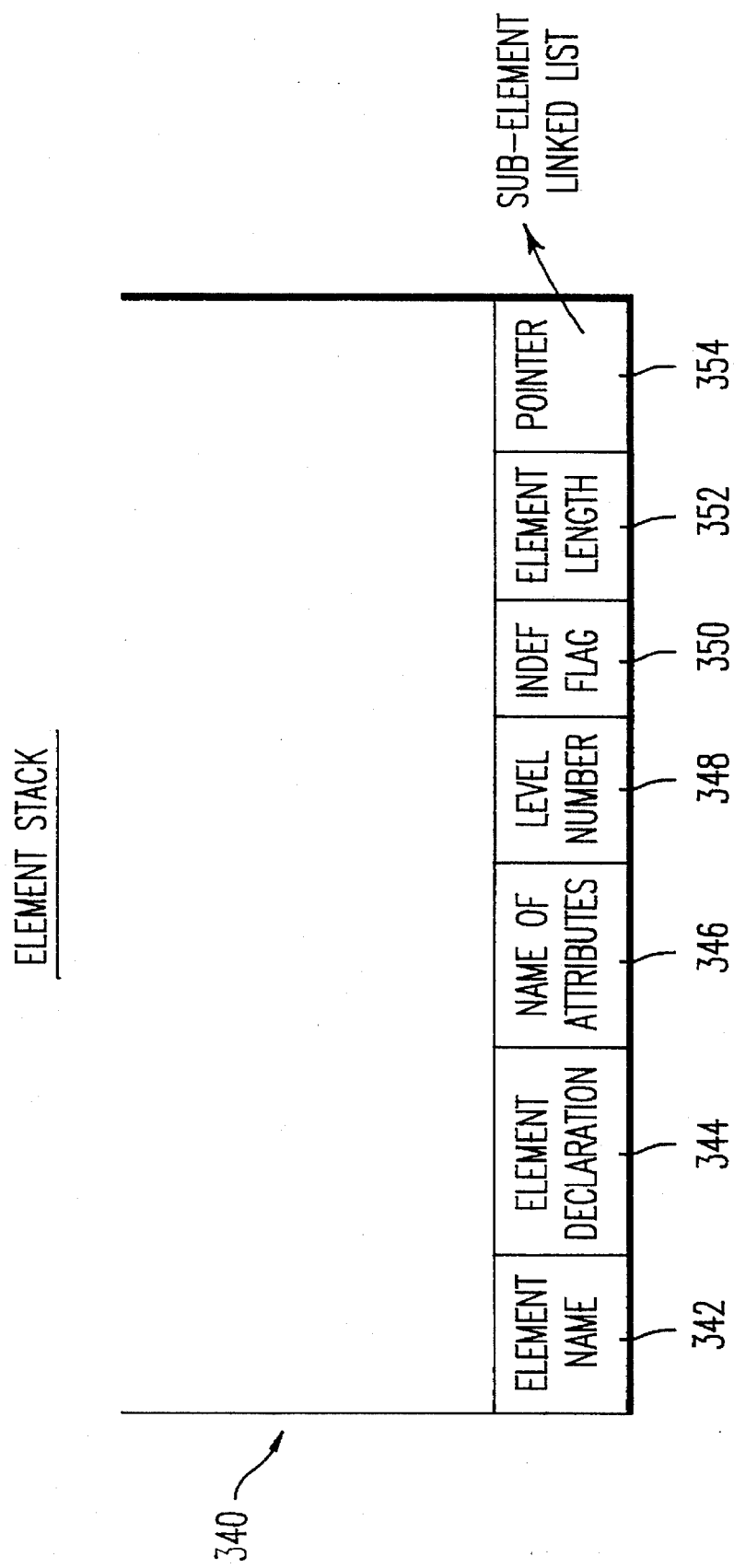
FIG. 11 illustrates the element stack used by the conversion process of the present invention.

FIG. 11 illustrates the element stack 340 used by the present invention during the process of converting a binary file to a cleartext SPDL file. Field 342 in the element stack 340 contains the element name which is the cleartext representation of the element being processed. Field 344 is the declaration of the element. Field 346 is used for processing the attributes of the element. After each attribute of an element is processed, the field 346 is decremented by one in order to keep track of the attributes processed for the element. Field 348 is used to keep track of the level number of each of the hierarchal levels of the document and is used to keep track of the indentation level in the cleartext SPDL file.

The indef flag 350 and element length field 352 are used for keeping track of the length of the binary element. A "1" in the indef flag 350 indicates that the binary element is in the indefinite length format. The element length field 352 is used for counting the bytes of the binary encodings as they are being processed. Pointer 354 points to the sub-element linked list which are similar to the linked lists illustrated in FIGS. 10A–10D.

Element stack 340 illustrated in FIG. 11 incorporates the indef flag and element length fields which are described in detail in commonly owned co-pending U.S. application Ser. No. 08/066,383 filed May 21, 1993 and entitled "METHOD AND SYSTEM FOR PROCESSING MIXED BINARY LENGTH ENCODINGS CONTAINING DEFINITE AND INDEFINITE LENGTH FORMATS", now U.S. Pat. No. 5,436,627, which is incorporated herein by reference. Other features of the element stack are somewhat similar to the element stack described in commonly owned co-pending U.S. patent application Ser. No. 08/147,603 filed Nov. 4, 1993 and entitled "STANDARD PAGE DESCRIPTION LANGUAGE CLEARTEXT STRUCTURE GENERATOR", now pending, incorporated herein by reference.

Figure 12:
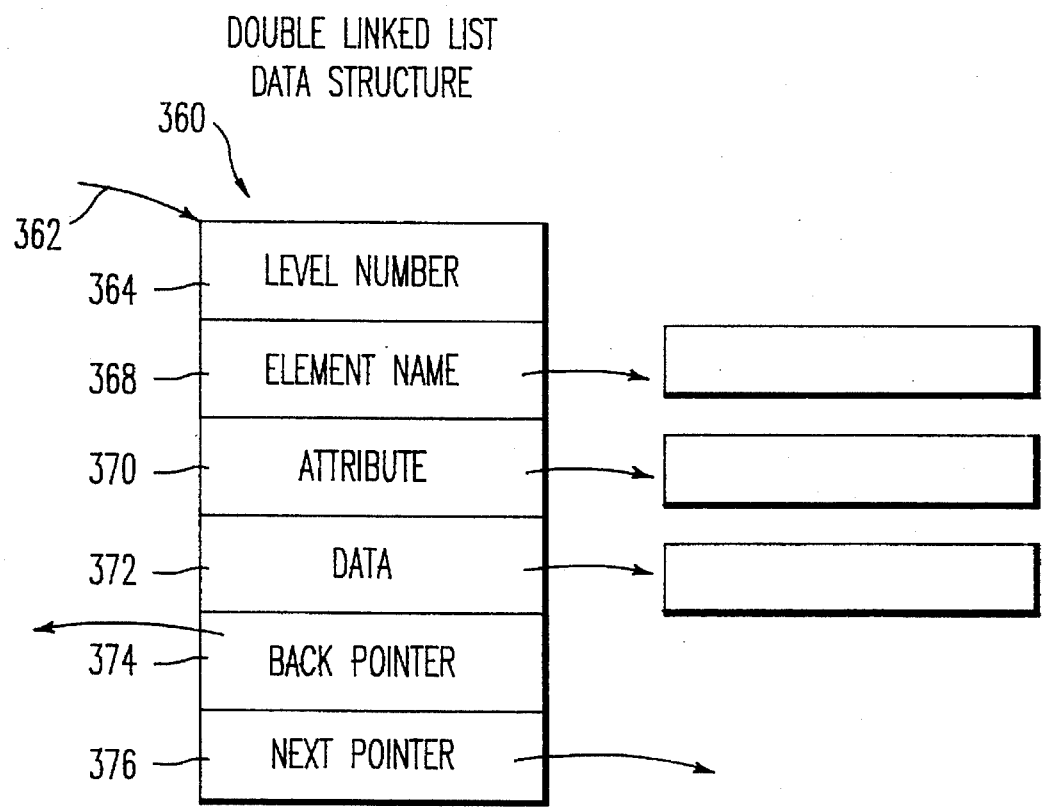
FIG. 12 illustrates the double linked list data structure used for storing the cleartext representation of each line before the cleartext representations are written to an output file.

The double linked list data structure 360 illustrated in FIG. 12 is used for keeping track of the cleartext converted information. Every time a binary element is processed and converted, the information for the element is stored in the double linked list data structure. After the conversion from binary to cleartext is complete, the information from each of the double linked list is copied to an output file similar to the document illustrated in FIG. 5B. This double linked list is useful in handling attributes of an element which can have a different order in the binary representation than the order in the cleartext representation.

The double linked list data structure 360 is pointed to by a pointer 362. Pointer 362 will correspond to a "next" pointer from a previous double linked list data structure if the double linked list data structure is not the first double linked list data structure for the file being converted. If the double linked list data structure is the first double linked list data structure of the file being converted, the pointer 362 can be a default value and simply used as a reference from the system to this first data structure. The field level number 364 indicates the indentation level of the element. The element name 368 indicates the cleartext name of the element. Entry 368 can be a pointer which points to a memory area which stores the name. Field 370 stores the attribute information, if any, of the elements. Field 370 can be a pointer which points to a separate memory location storing the attribute information.

Field 372 stores data which may be used by the element. For example, if the element is a comment, the data field would store the text of the comment. The data field can be a pointer which points to a separate memory location which stores the actual data. Field 374 stores a back pointer which points to a previous double linked list data structure if it exists. If a previous double linked list data structure does not exist, the back pointer points to null. The next pointer 376 points to a next double linked list data structure if one exists. If a next double linked list data structure does not exist, the next pointer 376 points to null.

Figure 13:
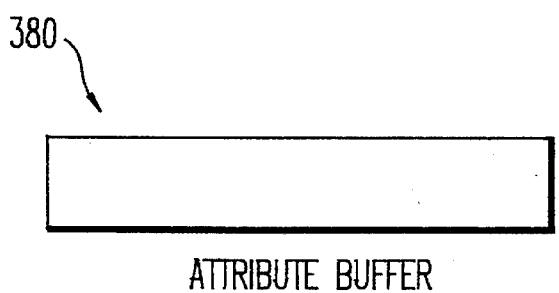
FIG. 13 illustrates an attribute buffer used by the present invention.

FIG. 13 illustrates an attribute buffer 380 used by the present invention. The attribute buffer 380 is used to temporarily store attribute information of an element as the element is being processed.

FIGS. 14A–14K illustrate the process used by the present invention to convert a binary SPDL file to a cleartext SPDL file. Step 402 of FIG. 14A parses the input command line to determine the input and output file names. Step 404 determines if the input file exists. If the input file does not, flow proceeds to step 406 where an error is indicated because the input file does not exist and the process is then exited. If the input file does exist, flow proceeds to step 408 where it is determined if the output file has been specified. If the output file has not been specified, the output file is assigned a default file name in step 410. Step 412 determines if the input file is an SPDL binary file. This can be done by examining the beginning portion of the file to determine if it contains the necessary bits indicating the file is a binary SPDL file. A more detailed description of how to determine if the file is a binary SPDL file can be found in commonly owned-co-pending U.S. patent application Ser. No. 08/006,416 entitled "METHOD AND SYSTEM TO RECOGNIZE ENCODING TYPE IN DOCUMENT PROCESSING LANGUAGE", now U.S. Pat. No. 5,438,650 which is incorporated herein by reference. If step 412 determines that the input file is not a binary SPDL file, step 414 indicates that the input file format is incorrect and the process is terminated. If the input file is a binary SPDL file, flow proceeds to process A illustrated in FIG. 14B. It is to be noted that the example given in FIGS. 5A, 5B, and 6 is based on the Draft International Standard whereas U.S. patent application Ser. No. 08/006,416, now U.S. Pat. No. 5,438,650 is based on a later version, which has not yet been printed in final form. However, in both versions, "28 CF 44 00" indicates a binary SPDL encoding.

Figure 14A:
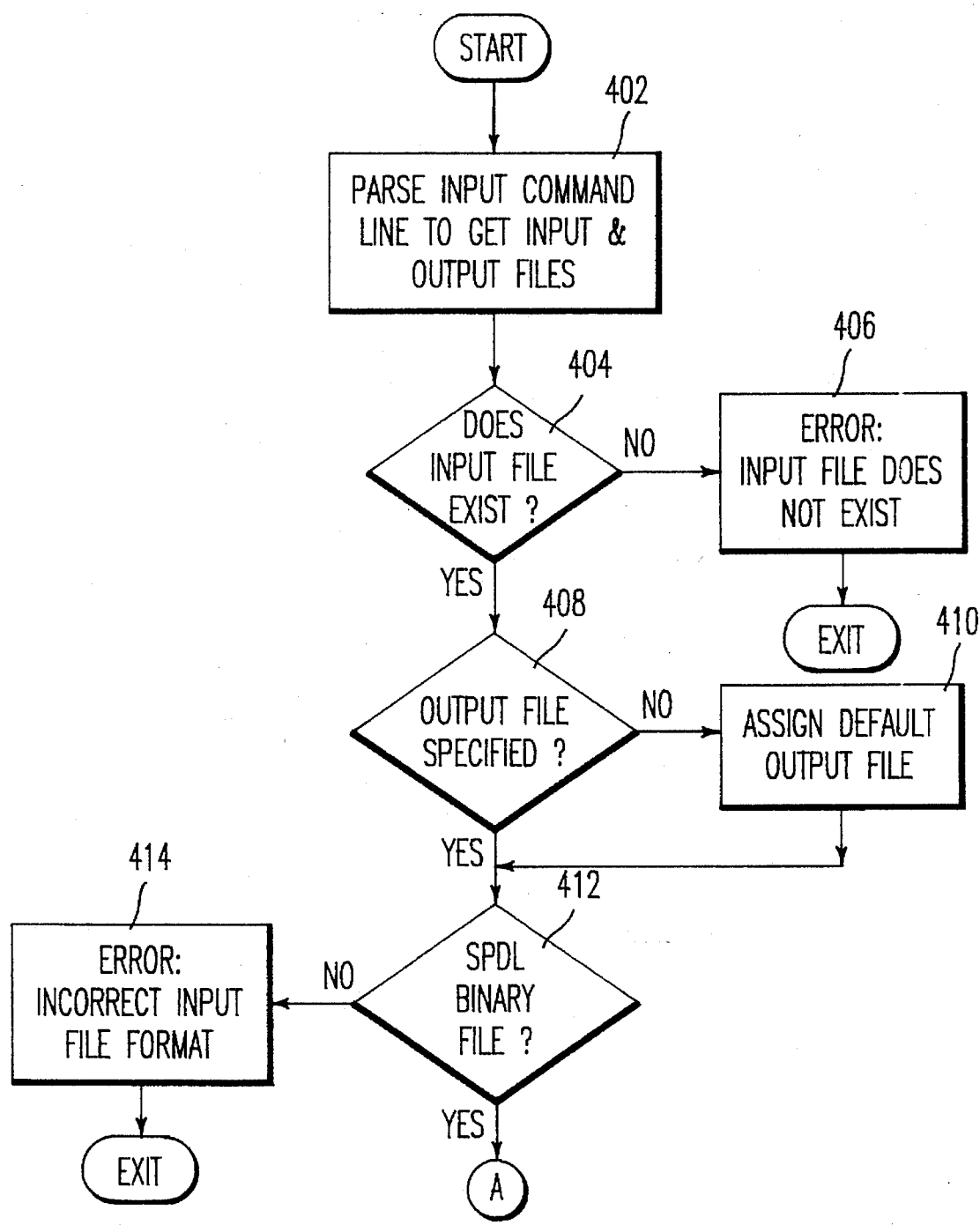
FIGS. 14A–14K illustrate flowcharts describing the process used by the present invention.
Figure 14B:
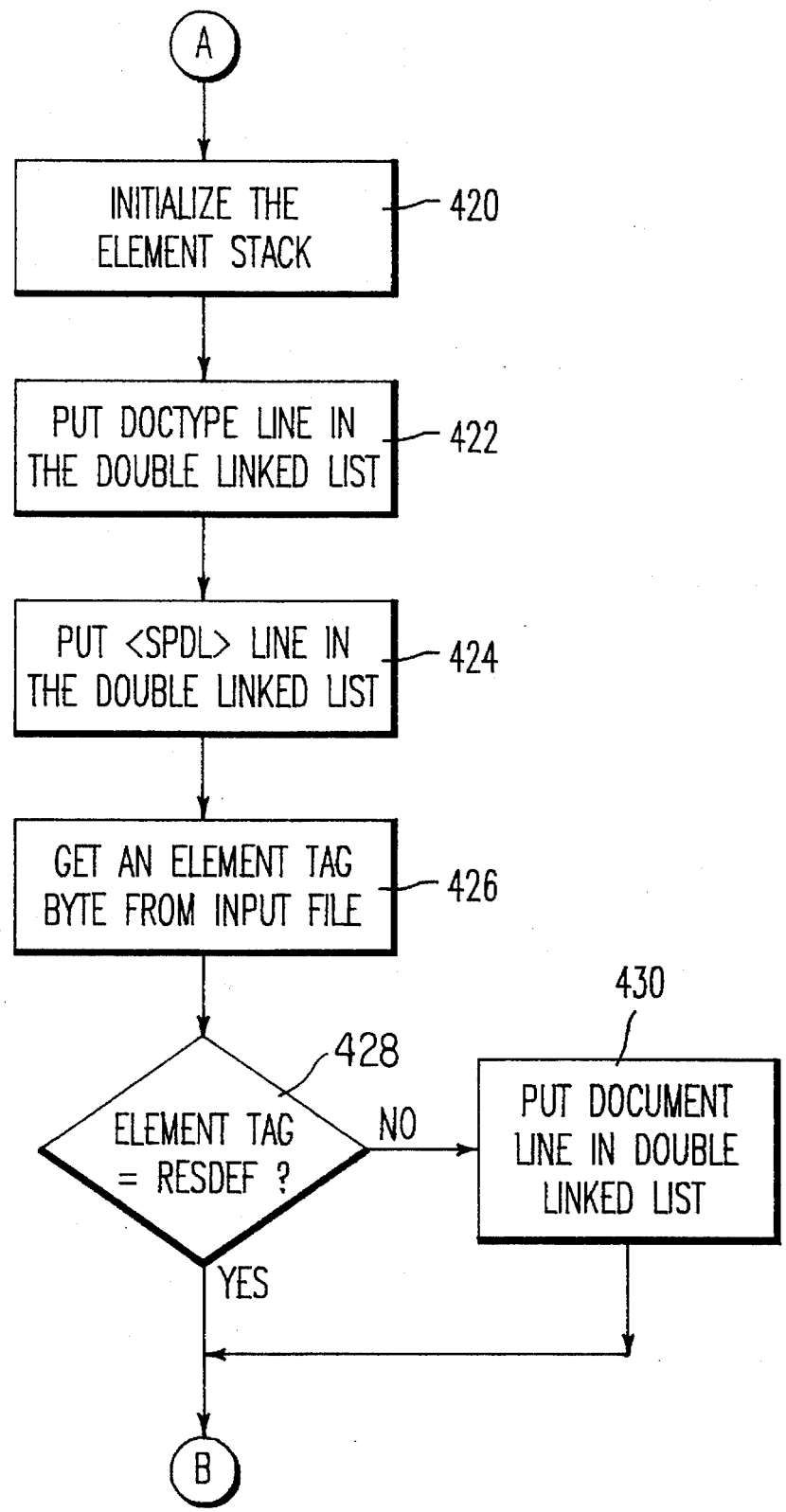

Step 420 of FIG. 14B initializes the element stack which simply reserves memory for the stack. Steps 422 and 424 write the first two lines of the cleartext file into the double linked list data structures. The first two lines of an SPDL cleartext file are always DOCTYPE and SPDL and therefore, it is necessary to put these two lines at the beginning of each SPDL file.

Step 426 obtains a tag in the input file and step 428 examines the tag to determine if it is equal to RESDEF. If the first tag is not RESDEF, the SPDL encoding rules require the third line of the cleartext encoding to be the document element. If the first element tag is RESDEF, it is not necessary to have the third line of the cleartext encoding be the document element. From steps 428 and 430, flow proceeds to process B illustrated in FIG. 14C.

Figure 14C:
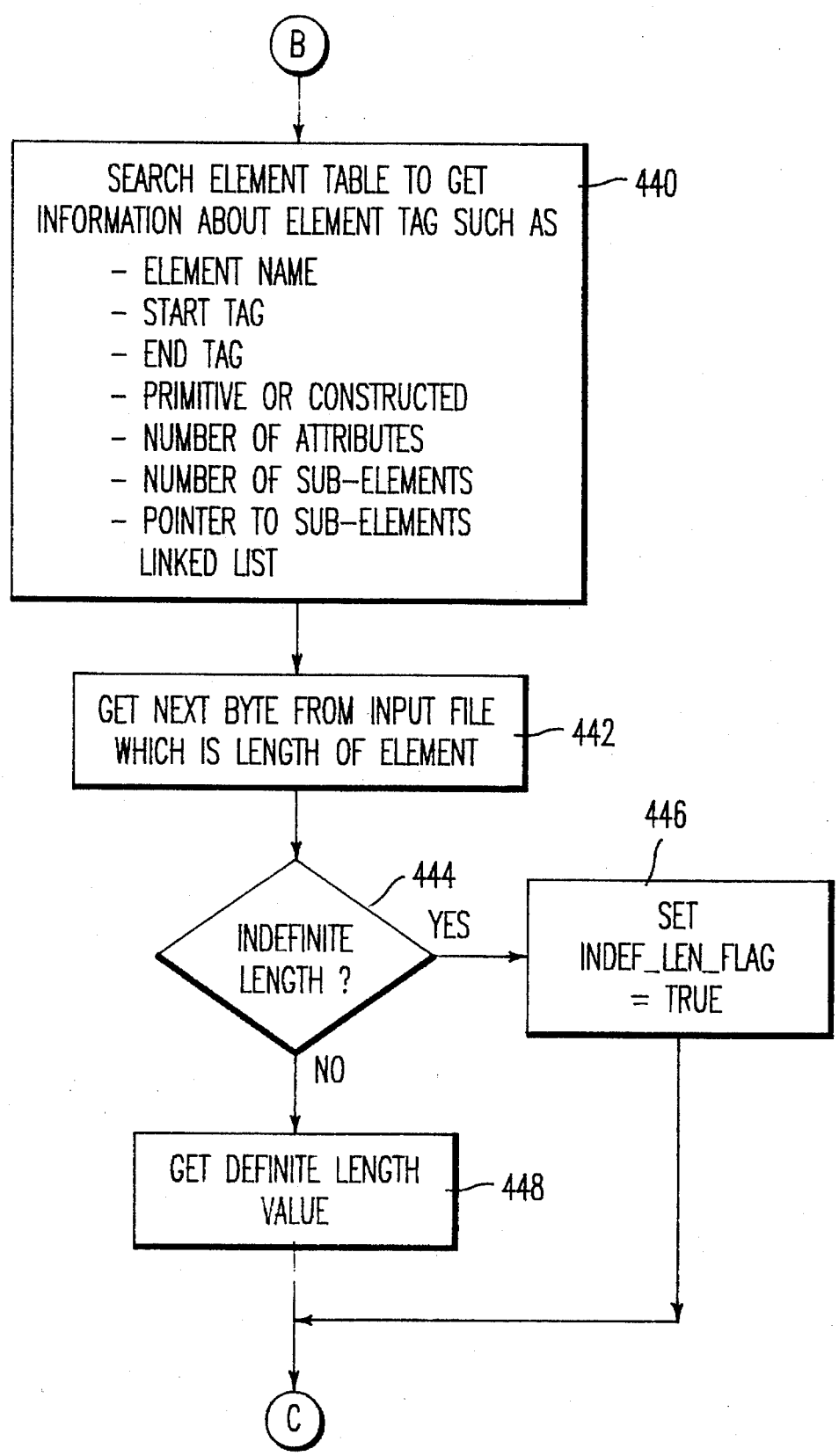

Step 440 of FIG. 14C searches the element table for the element corresponding to the binary tag and obtains information about the element tag such as the cleartext element name, whether the start tag and end tag are optional or required, whether the element is primitive or constructed, the number of attributes of the element, the number of sub-elements of the element, and the pointer to the sub-element linked list of the element. Step 442 reads the next byte of the input file which indicates the length of the element. When the length octet of an encoding is the binary 10000000, the length is indefinite. The end of an indefinite encoding is indicated by a 0000H in the contents OCTET. If step 444 determines that the encoding is in the indefinite length, step 446 sets the INDEF_LEN_FLAG to true, indicating that the encoding is in the indefinite length format. If the encoding is not determined to be in the indefinite length format in step 444, flow proceeds to step 448 where the value of the definite length encoding is determined. From step 448 and 446, flow proceeds to process step C illustrated in FIG. 14D.

Figure 14D:
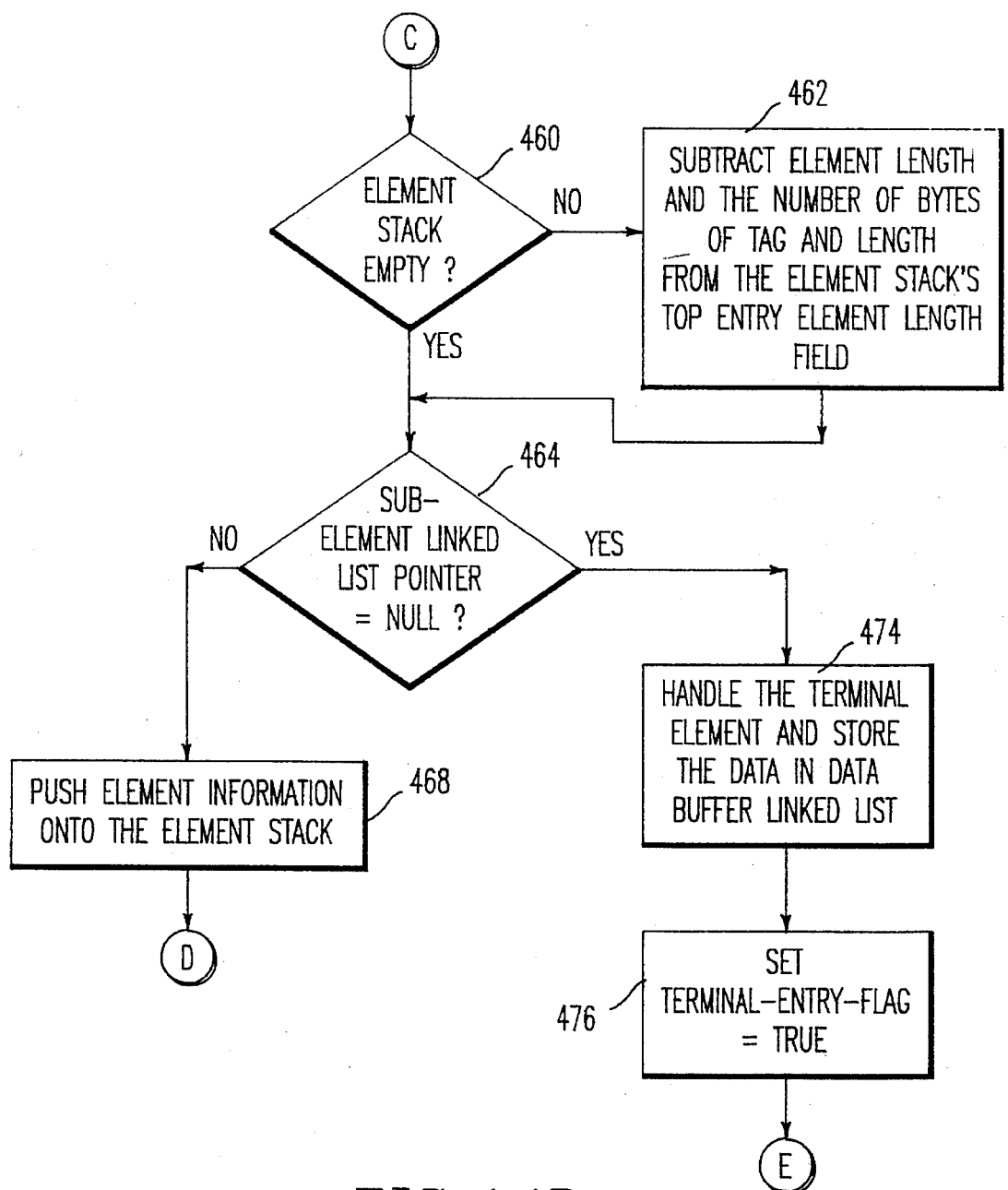

In FIG. 14D, step 460 examines if the element stack is empty. If it is not, it is necessary to subtract the number of bytes of the tag being processed and the bytes used by the tag and length portion of the tag from the top entry in the element stack in order to account for these bytes in step 462. If the length type of the current tag is definite, this definite length is also subtracted. In many instances, the tag will be one byte and the length will be one byte and therefore two bytes will be subtracted from the length field of the top entry in the element stack.

From Steps 460 and 462, flow proceeds to step 464 where it is determined if the sub-element linked list pointer is equal to null. If the sub-element linked list pointer is equal to null, there are no sub-elements for the element and therefore, the element is a terminal element and flow proceeds to step 474 which stores data for the data pertaining to the terminal element in the buffer pointed to by the pointer 372 of the corresponding double linked list data structure 360. Flow proceeds to step 476 where the TERMINAL_ENTRY_FLAG is set equal to true. From step 476, flow proceeds to process E illustrated in FIG. 14G which stores the information of the element in a new double linked list.

If step 464 determines that the sub-element linked list pointer is not equal to null, there are sub-elements of the element and flow proceeds to step 468 to begin handling the sub-element information. Step 468 pushes the element information obtained in step 440 onto the element stack. From step 468, flow proceeds to process D illustrated in FIG. 14E.

Figure 14E:
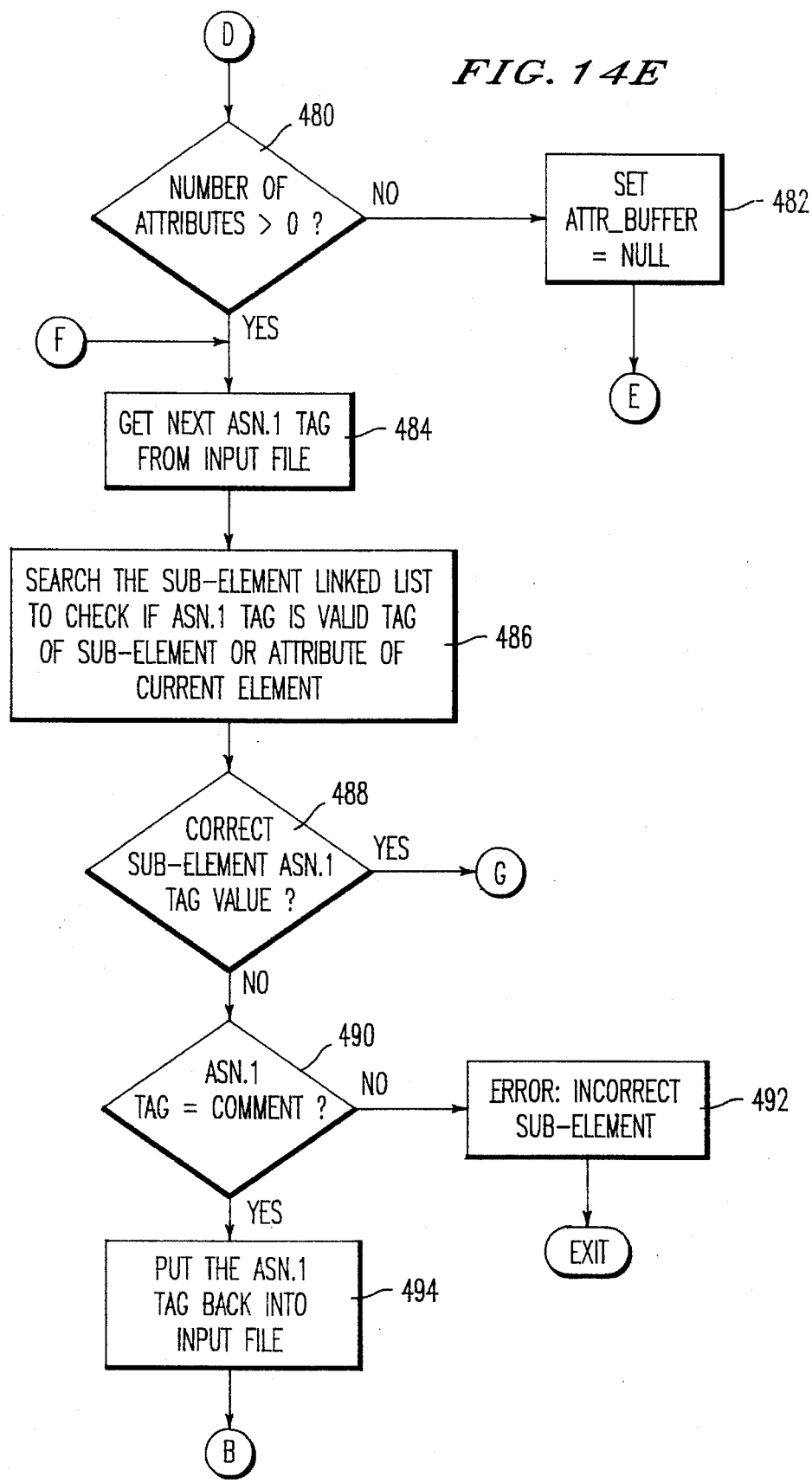

In FIG. 14E, step 480 determines if the number of attributes (which are stored in the element stack) are greater than zero. If the number of attributes is not greater than zero, step 482 sets the attribute buffer ATTR_BUFFER equal to null and flow proceeds to E illustrated in FIG. 14G. If the number of attributes is greater than zero, the attributes must be processed and flow proceeds from step 480 to step 484 which obtains the next ASN.1 tag in the input file. Step 486 then searches the sub-element linked list to check to see if the ASN.1 tag is a valid tag of a sub-element or attribute of the current element. If the sub-element is a correct ASN.1 sub-element of the element, flow proceeds to process G illustrated in FIG. 14F. If the element being processed is not a proper sub-element of the element being processed, flow proceeds to step 490 to determine if the tag is a comment. If the flag is not a comment, the sub-element is incorrect for the element and step 492 indicates an error and the process is exited. If the tag is a comment, the tag is put back into the input file for processing as an element and flow returns to process B of FIG. 14C.

Figure 14F:
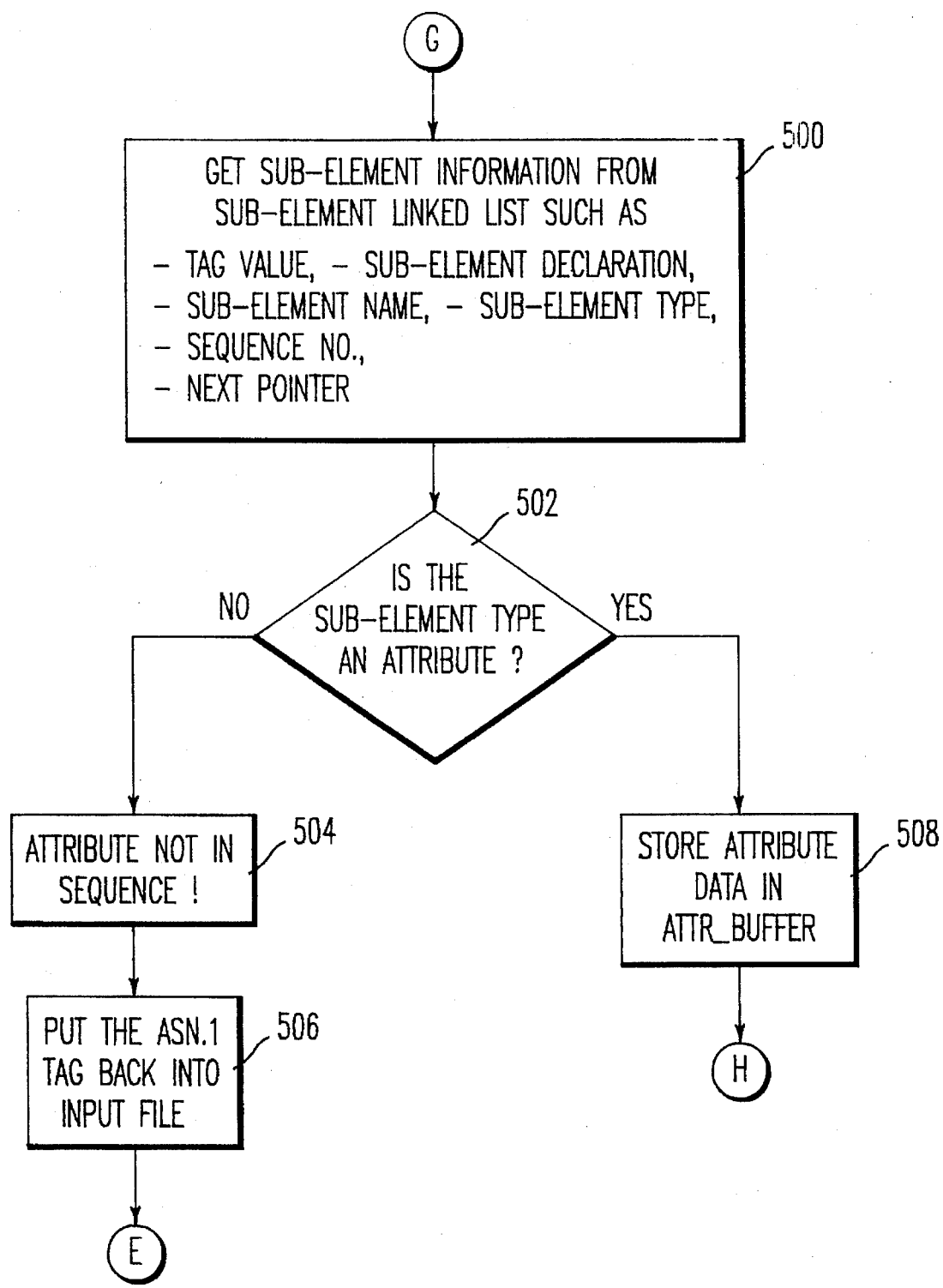

Process G illustrated in FIG. 14F handles the processing of correct sub-elements and originates from step 488 in FIG. 14E. In step 500 of FIG. 14F, information on the sub-element from the sub-element linked lists are obtained such as the ASN.1 tag value, the sub-element declaration, the sub-element name, the sub-element type, the sequence number of the sub-element, and the next pointer to a subsequent sub-element linked list data structure. Step 502 examines the sub-element type to determine if the sub-element is an attribute. If the sub-element is an attribute, step 508 stores the attribute data in the attribute buffer ATTR_BUFFER and flow proceeds to process H illustrated in FIG. 14G. If step 502 determines that the sub-element type is not an attribute, flow proceeds to step 504. Step 504 indicates that the attribute is not in sequence. Attributes of an element should occur immediately after the element and before the occurrence of sub-elements of the element. If step 480 determines that the number of attributes is greater than zero and flow reaches step 502, the sub-element should be an attribute (although it is not required to be an attribute). If it is not an attribute, the attributes which will eventually follow the current sub-element will be out of order. The present invention puts the attributes in order when they occur at a later time using steps 606 and 608 of the flowchart illustrated in FIG. 14K. After step 504, step 506 puts the out of order tag back into the input file and flow proceeds to process E in FIG. 14G for further processing.

Figure 14G:
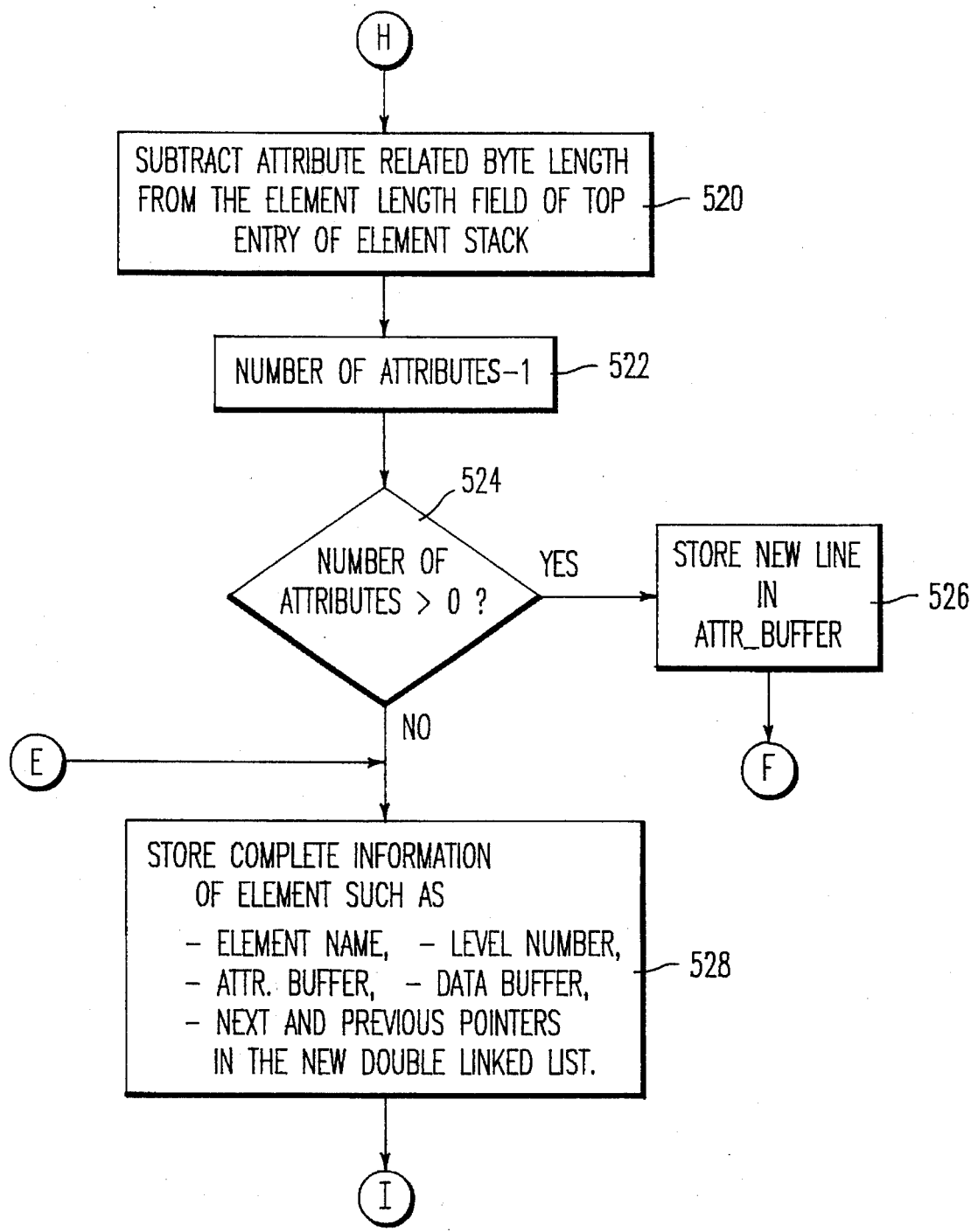
Figure 14H:
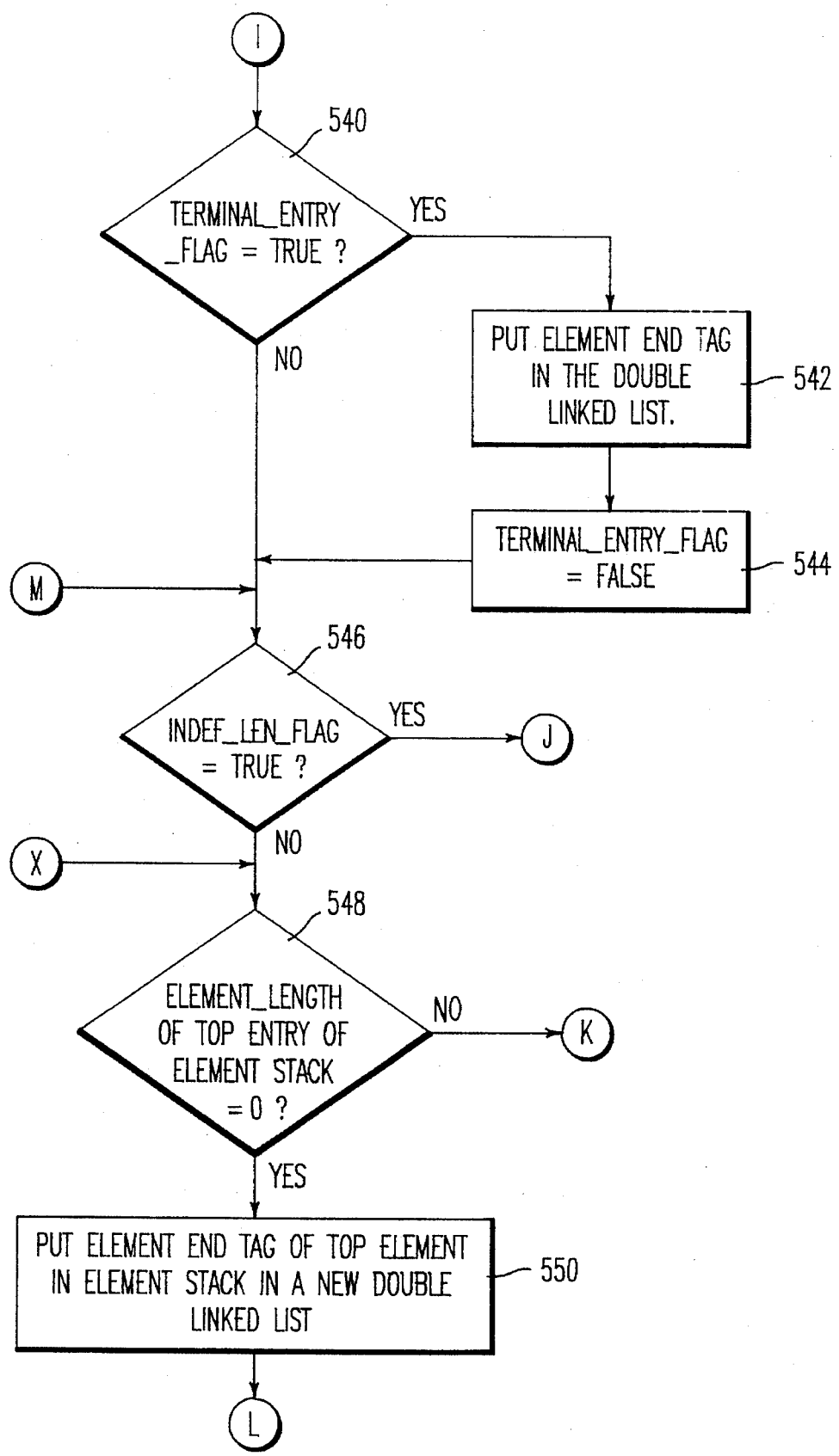

Process H of FIG. 14G handles the processing of sub-elements which are attributes. Step 520 in FIG. 14G subtracts the length of the attributes from the top entry in the element stack. Step 522 decrements the number of attributes in the element stack by one. Step 524 examines if the number of attributes in the top entry of the element stack is greater than zero. If the number of attributes is greater than zero, more attributes must be processed and flow proceeds to step 526. Step 526 stores a new line character in the attribute buffer and flow proceeds back to process F illustrated in FIG. 14E for processing of the remaining attributes.

If step 524 determines that the number of attributes is not greater than zero, flow proceeds to step 528 where all of the information of the element being processed including the element name, level number, attribute buffer, the data information, and the next and previous pointers are stored in a new double linked list data structure. From step 528, flow proceeds to process I illustrated in FIG. 14H.

Step 540 examines if the TERMINAL_ENTRY_FLAG is true. The TERMINAL_ENTRY_FLAG was set equal to true in step 476 of FIG. 14D. If the flag was not set, the default value of the TERMINAL_ENTRY_FLAG is false. If it is true, flow proceeds to step 542 indicating that the current element is a terminal element and the element end tag for the element is written in a new double-linked list data structure. Step 544 then sets the TERMINAL_ENTRY_FLAG equal to false.

From steps 540 and 544, step 546 examines if INDEF_LEN_FLAG is equal to true. If it is true, flow proceeds to process J illustrated in FIG. 14I for processing of the indefinite length format. Otherwise, flow proceeds to step 548 where the element length of the top entry of the element stack is examined to determine if it is equal to zero. If the length is not equal to zero, the element is in the definite length and the entire length of the element is not finished being processed and flow proceeds to process K illustrated in FIG. 14K for further processing. Otherwise, the length of the top entry of the element stack is zero, the current element at the top of the element stack is finished being processed and step 550 puts the end tag of the top element in the element stack in a new double linked list data structure. From step 550 flow proceeds to L in FIG. 14J.

Figure 14I:
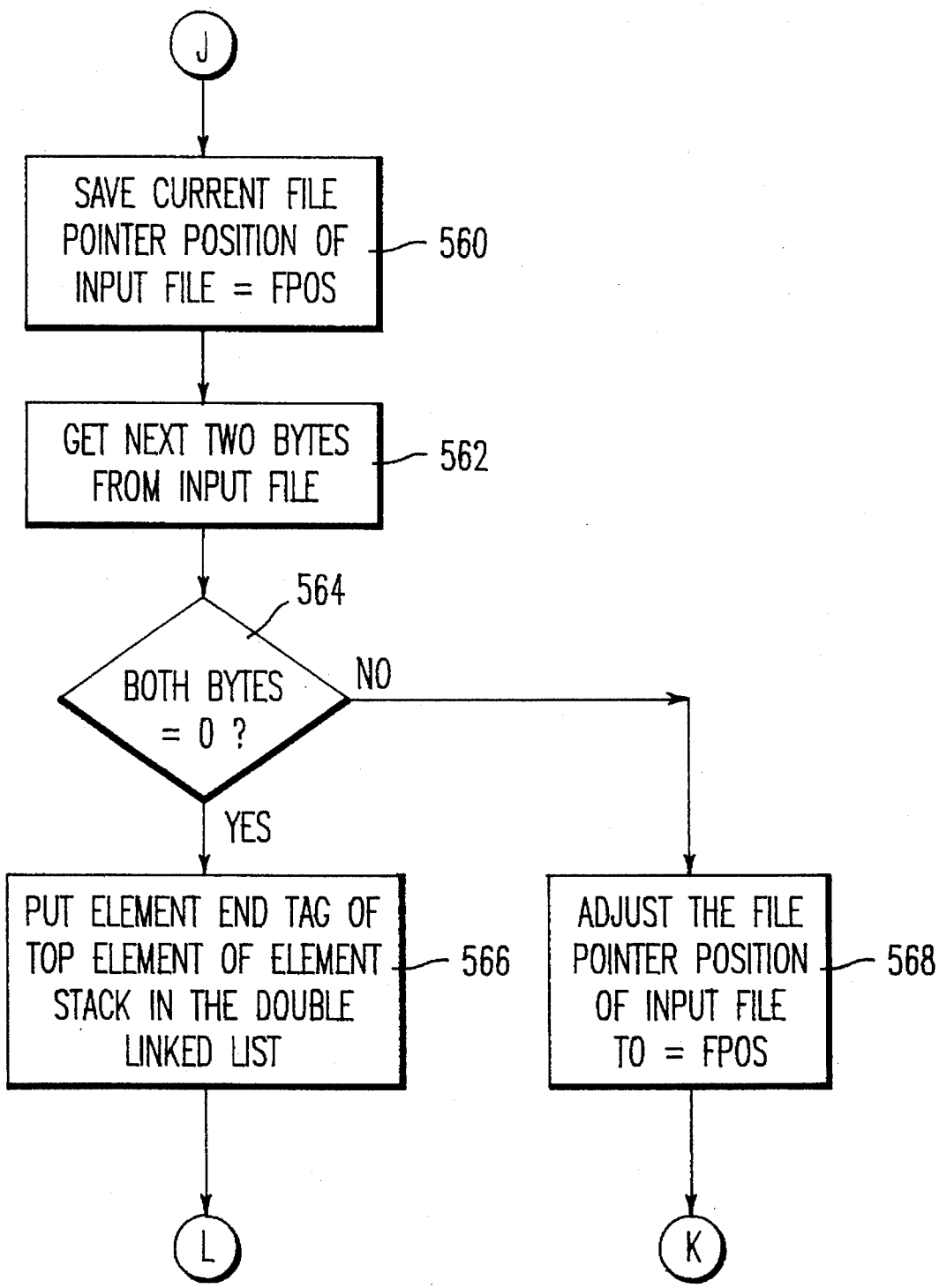

Process J illustrated in FIG. 14I handles the processing of the indefinite length format. Step 560 saves the current position in the input file to the variable FPOS. Step 562 obtains the next two bytes from the input file. Step 564 examines if both of these bytes are equal to zero. If they are, this signals the end of the indefinite length coding format and flow proceeds to step 566 where the end tag of the current element being processed is written into a double linked list data structure and then to L in FIG. 14J. If the end flag has not been reached, flow proceeds from step 564 to step 568 where the pointer of the input file is adjusted back to the position FPOS so that the last two bytes of the file which were read in step 562 can be processed. From step 568, flow proceeds to K in FIG. 14K.

Figure 14J:
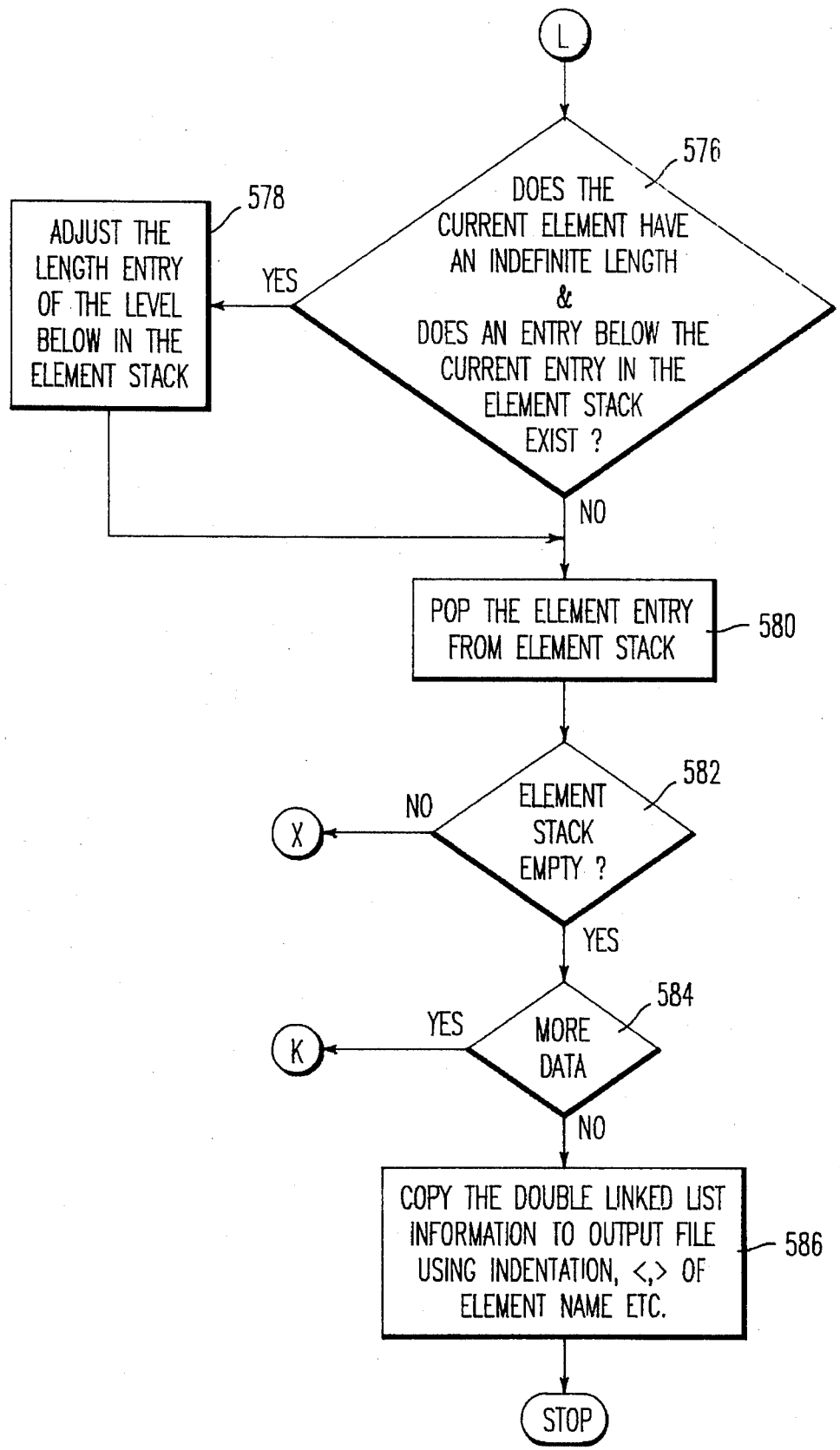

In process L illustrated in FIG. 14J, step 576 determines if the current element is in the indefinite length format and an entry below the current entry exists. If it does, the length entry of the level below in the element stack is adjusted by adding the length of the current element (it is a negative number) to the length entry in the level below. Then step 580 pops the top entry off of the element stack.

If step 582 determines that the element stack is empty and step 584 determines that there is more data to be processed, flow proceeds to step 586 where the information from the double linked list data structures is copied to an output file and the process is terminated. If the element stack is not empty or there is more data to be processed, flow proceeds to process K illustrated in FIG. 14K.

Figure 14K:
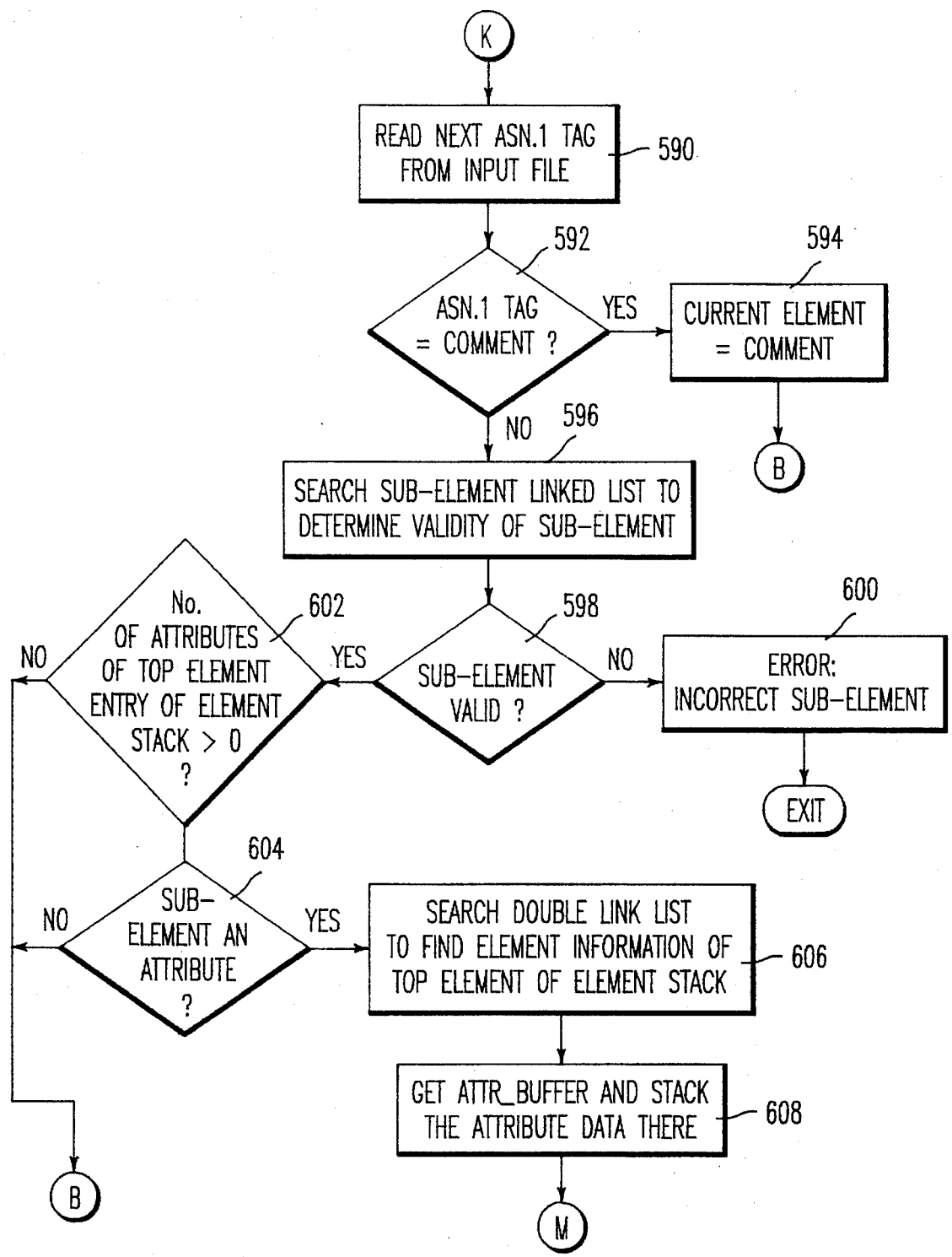

In FIG. 14K, step 590 reads the next tag of the binary input file. Step 592 examines if the tag is a comment and if it is, the current element is set equal to a comment and flow proceeds to process B illustrated in FIG. 14C. If the next tag is not a comment, flow proceeds from step 592 to step 596 where the sub-element linked list is searched to determine the validity of the sub-element. This step determines if the current sub-element is permitted to appear under the element being processed. If step 598 determines that the sub-element is not valid, an error is indicated because of the incorrect sub-element in steps 600 and the process is exited. If step 598 determines that the sub-element is valid, flow proceeds to step 602.

In step 602, the number of attributes of the top element in the element stack is examined to determine if it is greater than zero. If it is not, the sub-element is not an attribute and flow proceeds to process B. If the number of attributes at the top entry of the element stack is greater than zero, flow proceeds to step 604 to determine if the sub-element is an attribute. If step 604 determines that the sub-element is not an attribute, flow proceeds to process B. If step 604 determines that the sub-element is an attribute, step 606 searches the double linked list to find the element information of the top element in the element stack. Step 608 then stores the attribute in the attribute buffer. Flow then proceeds to process M illustrated in FIG. 14H.

Figure 15A:
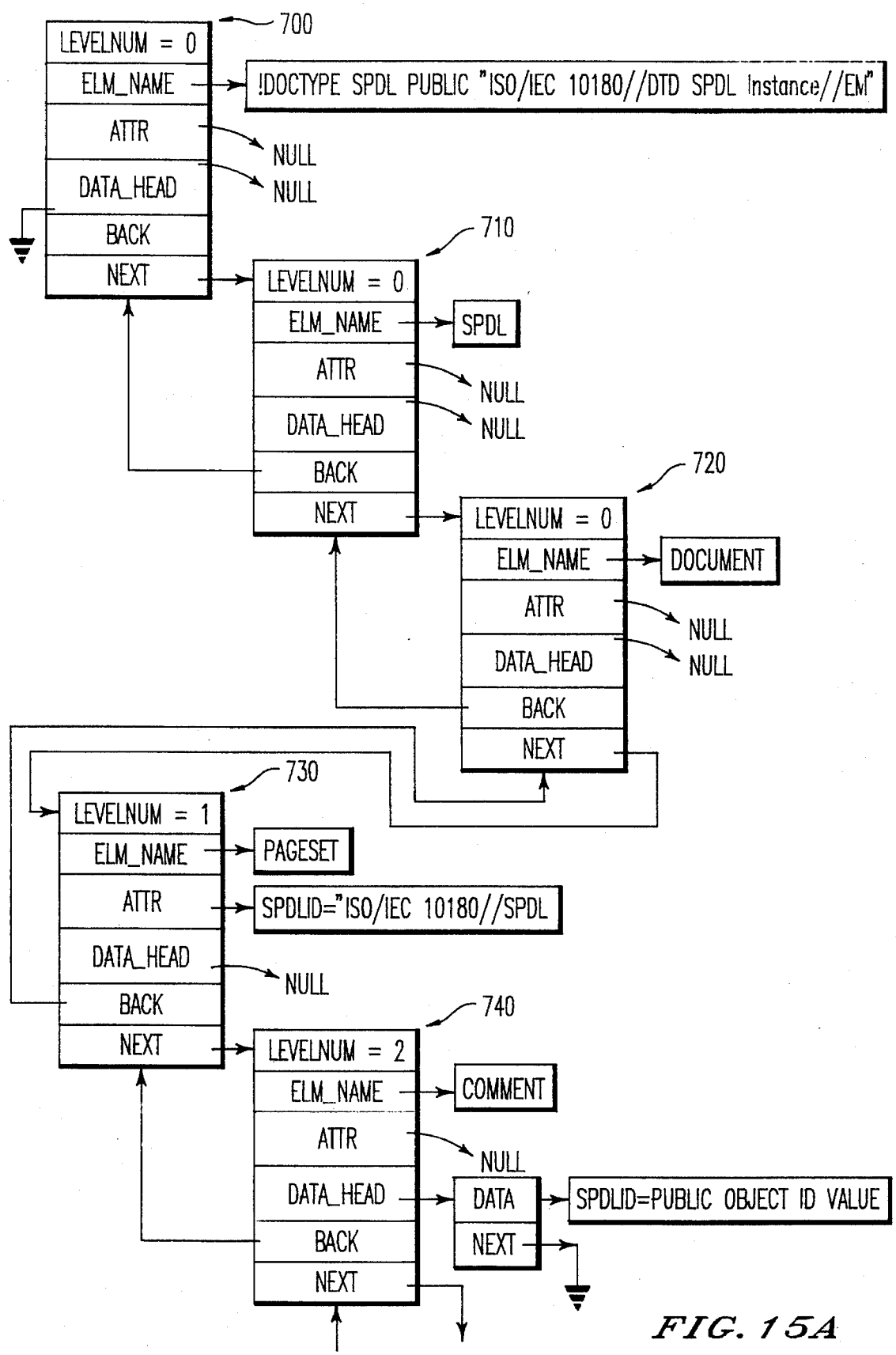
FIGS. 15A and 15B illustrate the double linked list data structures generated as the binary document illustrated in FIG. 5A is being converted.
Figure 15B:
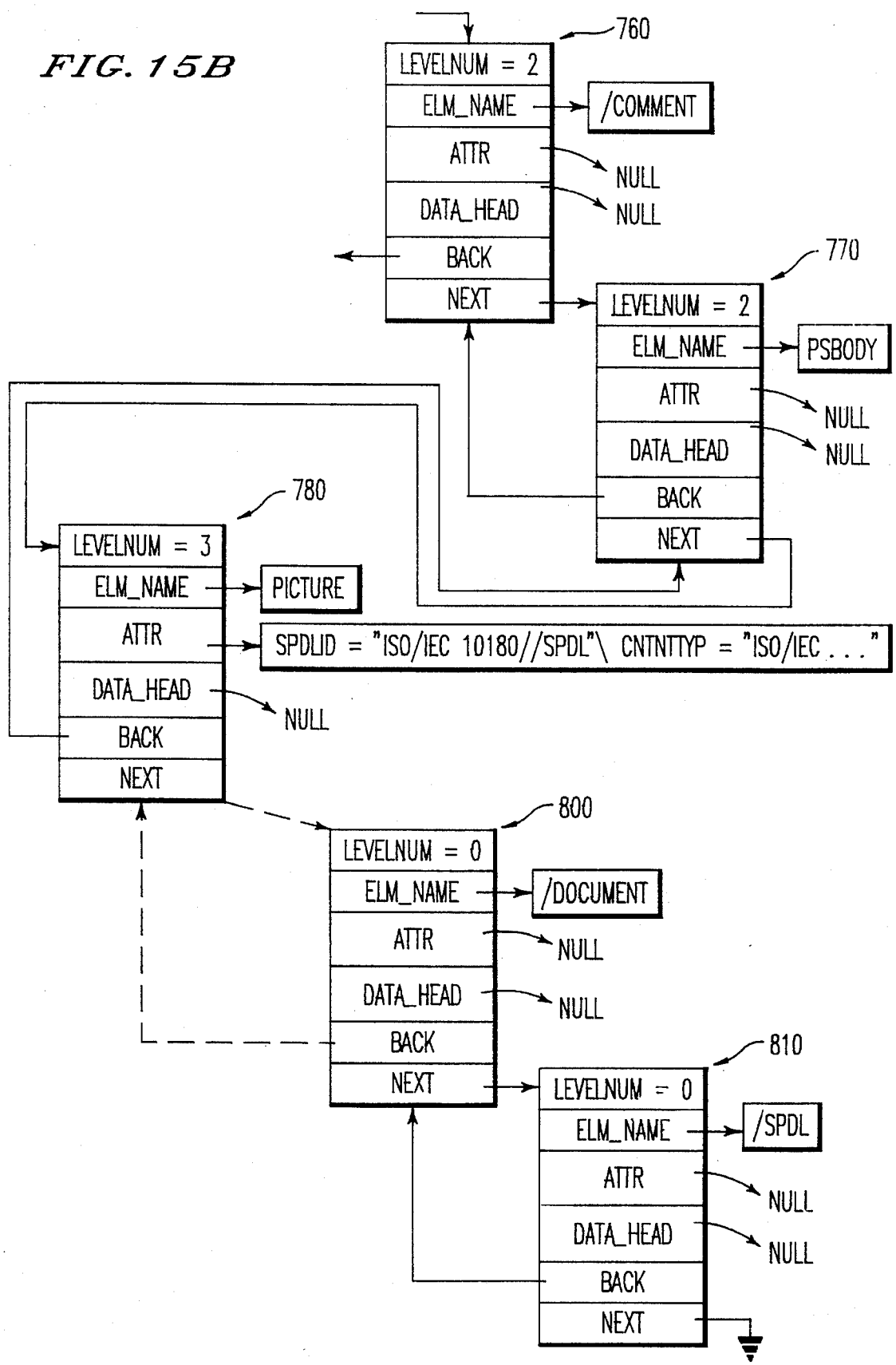

FIGS. 15A and 15B illustrate the double linked list data structures constructed when the binary file illustrated in FIG. 5A is converted to the cleartext file illustrated in FIG. 5B. The first double linked list data structure 700 is at indent level zero, the element name is !DOCTYPE, it has no attribute or data and points to double linked list data structure 710. Double linked list data structure 710 is at indent level zero, is named SPDL, has no attributes or data in the date field, points back to double linked list data structure 700 and points to next double linked list data structure 720.

Double linked list data structure 720 points to double linked list data structure 730 which is at indent level 1, has an element which is a pageset, has the attribute SPDL ID defined and points to double linked list data structure 740. Double linked list data structure 740 is at level 2, is a comment, has no attribute, and has a data which contains the content of the comment. Notice the DATA_HEAD entry of the double linked list data structure 740 points to a linked list data structure which points to the actual data. It is possible that the next entry of the linked list data structure pointed to by the DATA_HEAD entry of the double linked list data structure 740 points to a subsequent linked list data structure.

Double linked list data structure 740 points to double linked list data structure 760 illustrated in FIG. 15B. The data structures illustrated in FIG. 15B can be interpreted in a similar manner as the data structures in FIG. 15A. Note that for brevity's sake, some of the data structures between double linked list data structure 780 and double linked list data structure 800 have been omitted but can be easily determined by tracing through the process of the present invention and/or looking at the cleartext example illustrated in FIG. 5B.

FIGS. 16A–16E illustrate the element stack as the example in FIGS. 5A and 5B is being processed. The sub-element linked list pointed to by the pointer in the element stack remains constant and will be the same general type of linked list that are illustrated in FIGS. 10A–10D.

Turning now to the flow charts illustrated in FIGS. 14A–14K for an example of how the binary SPDL file is processed according to the present invention, the process of the present invention begins in FIG. 14A and it is assumed that an input and output file are specified and flow proceeds to FIG. 14B. Step 422 creates the double-linked list data structure 700 illustrated in FIG. 15A. Step 424 creates the double-linked list data structure 710 illustrated in FIG. 15A. Step 426 then gets the element tag byte 61 which is the first element appearing in the file illustrated in FIG. 5A. The element 61 corresponds to a PAGESET and not the element RESDEF and flow proceeds to step 430 which creates the double linked list 720 of FIG. 15A. Flow then proceeds to process B in FIG. 14C. Step 440 searches the element table to get information about the element 61 including the element name such as PAGESET and all other information listed in step 440. The next byte of the input file is 59 which is the definite length value of the PAGESET. Therefore, flow proceeds from step 442 to step 444 and step 448 to step 460 in FIG. 14D.

Figure 16A:
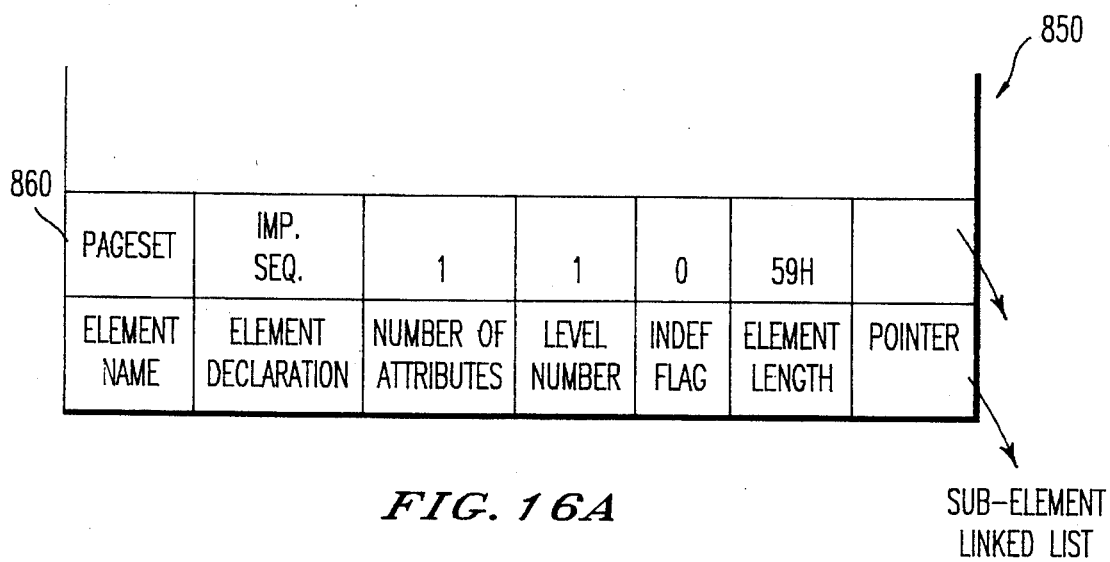

In FIG. 14D, step 460 determines that the element stack is empty because no elements have yet been pushed on the element stack. Step 464 determines that the sub-element linked list pointer is not equal to null and flow proceeds to step 468 which pushes the element information onto the element stack. The element stack is now as illustrated in FIG. 16A. Flow then proceeds to process D illustrated in FIG. 14E.

The number of attributes of the PAGESET is greater than zero and flow proceeds from step 480 to step 484 where the next ASN.1 tag is obtained from the input file which is 06. As 06 is a proper sub-element of the PAGESET, flow proceeds from step 488 to process G illustrated in FIG. 14F. Step 500 gets the information of the sub-element and step 502 determines that the sub-element is an attribute. Because the PAGESET element has an attribute and the first sub-element of the PAGESET is an attribute, the attribute is in sequence and flow proceeds to step 508 where the attribute data is stored in the attribute buffer ATTR_BUFFER. Flow then proceeds to process H illustrated in FIG. 14G.

In FIG. 14G, step 520 subtracts the length of the attribute from the top entry of the element stack. As the length of the SPDL ID is four bytes, four plus the number of bytes of the length information and the number of bytes of the SPDL ID and the number of bytes of the length of the PAGESET are subtracted from the element length of the stack illustrated in FIG. 16A. As the first attribute has been processed, step 522 reduces the number of attributes by one and as the PAGESET has only one attribute, flow proceeds from step 524 to step 528 where the information of the element is stored in a new double linked list data structure 730 illustrated in FIG. 15A. As the PAGESET is the first indentation level of FIG. 5B, the level number entry of the double linked list data structure 730 is set equal to one. From step 528, flow proceeds to process I illustrated in FIG. 14H.

As the TERMINAL_ENTRY_FLAG was initialized as false, flow proceeds from step 540 to step 546 and step 548 and it is determined that the element length of the top entry of the element stack is not equal to zero. Flow then proceeds to process K illustrated in FIG. 14K.

In FIG. 14K, step 590 reads the next ASN.1 tag from the input file which is 44. This tag is a comment tag and step 594 sets the current element equal to a comment and flow proceeds to process B illustrated in FIG. 14C.

In FIG. 14C, step 440 searches the element table to get information regarding the comment and step 448 obtains the definite length value of the comment which is 1F. Flow then proceeds to step 460 which determines that the element stack is not empty and the length of the comment is subtracted from the element length entry of the PAGESET in the stack in step 462. Step 464 then determines that the sub-element linked list pointer is equal to null because the comment element does not have any sub-elements. The information contained in the comment is stored in a data buffer linked list data structure. Step 476 then sets the variable TERMINAL_ENTRY_FLAG equal to true and flow proceeds to process E illustrated in FIG. 14G.

In FIG. 14G, step 528 stores the information of the comment into the double linked list data structure 740 illustrated in FIG. 15A. Flow then proceeds to process I illustrated in FIG. 14H. In step 540, the answer is yes as this variable was set equal to true in step 476 of FIG. 14D. Flow then proceeds to step 542 where the element end tag is written in the double linked list data structure 760 illustrated in FIG. 15B. Flow proceeds to steps 546, 548 and then to process K illustrated in FIG. 14K.

Step 590 in FIG. 14K reads the next ASN.1 tag from the input file which is A1 corresponding to the pageset body. Flow then proceeds from 592 to steps 596, 598, 602 and then to process B illustrated in FIG. 14C.

Figure 16B:
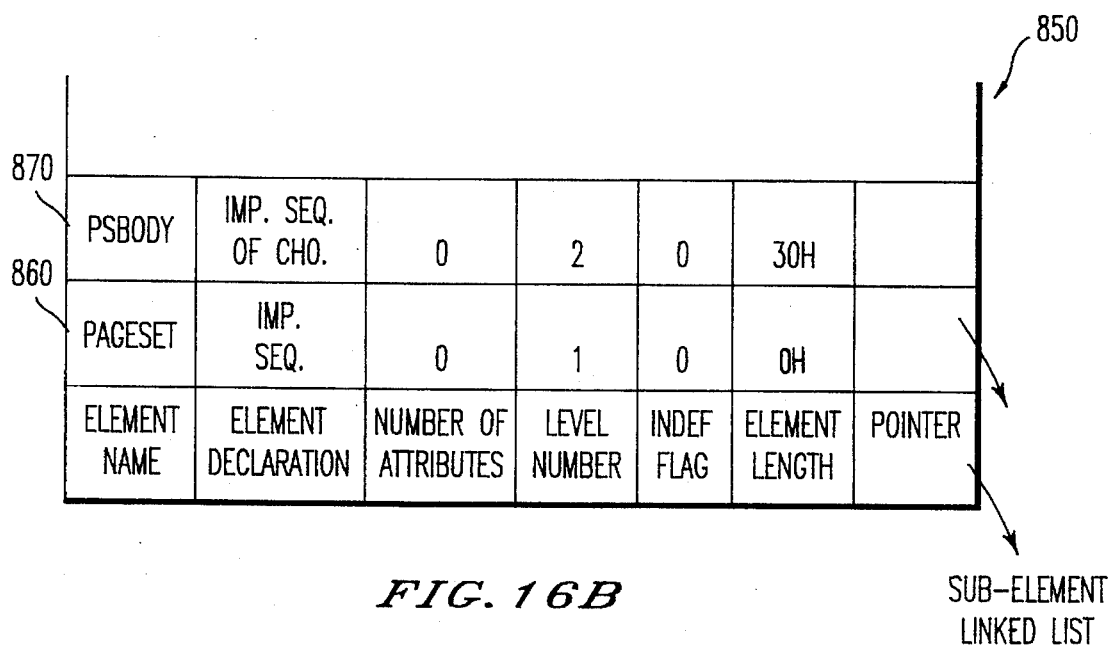

In FIG. 14C, the element table is searched to get information about the pageset body. Flow then proceeds to process C illustrated in FIG. 14D where step 462 subtracts the length of the pageset body element from the element length entry of the PAGESET entry in the stack 850 illustrated in FIG. 16A. Step 464 determines that the sub-element linked list pointer of the pageset body is not equal to null and flow proceeds to step 468 which pushes the element information of the PAGESET onto the element stack. The element stack is now as illustrated in FIG. 16B.

Figure 16E:
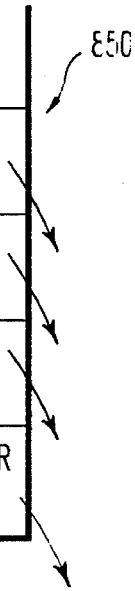

In a similar manner, the remaining portion of the binary file illustrated in FIG. 5A is processed according to the flow charts of the present invention to achieve the element stack as illustrated in FIGS. 16C, 16D, and 16E and the double linked list data structures illustrated in FIGS. 15A and 15B. A further tracing through the flow charts is omitted for brevity sake.

Figure 17:
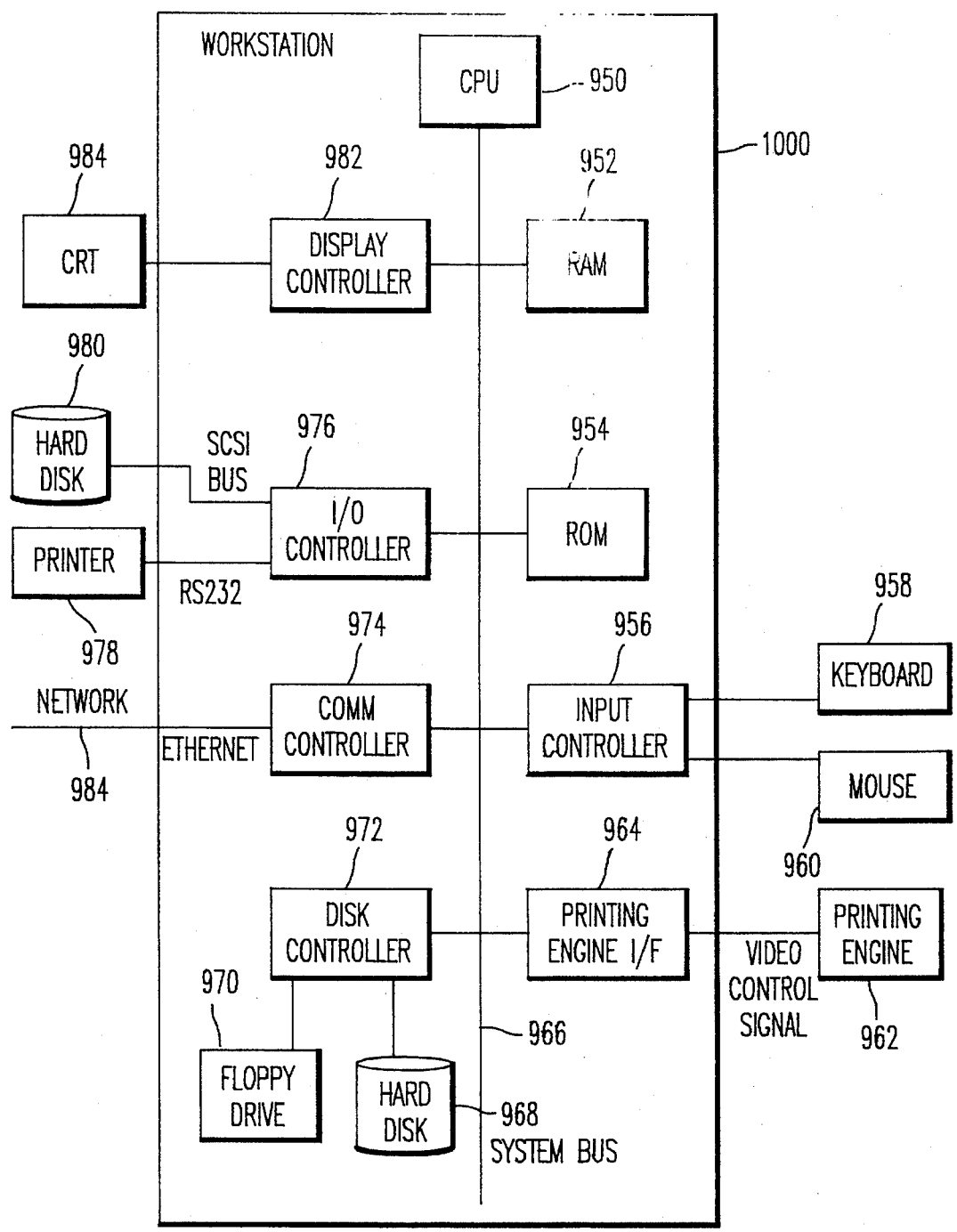
FIG. 17 illustrates a hardware embodiment of the present invention.

FIG. 17 illustrates the make-up of a workstation 1000 which can be used to run the process of the present invention. Workstation 1000 contains CPU 950, RAM 952, ROM 954, input controller 956 connected to a keyboard 958 and a mouse 960. A printing engine interface 964 is connected directly to a printing engine 962 which receives video and control signals representing image data transmitted by the interface 964. The workstation further contains a disk controller 972 connected to a hard disk 968 and a floppy drive 970, a communication controller 974, for connection to the network 984 which can be, for example, an Ethernet® Network, and I/O controller 976 connected to an external hard disk 980 through an SCSI bus, for example, and a printer 978 connected through an RS-232 cable, for example. The workstation also contains a display controller 982 connected to a CRT 984. The system bus 966 connects the elements within the workstation.

The process of the present invention can be stored in any of the storage devices illustrated in FIG. 17. Further, as the process of the present invention is operating, data which is created and used during the process can be stored in any of the storage devices illustrated in FIG. 17.

It is to be noted that the data structures used by the present invention can be used by some of the other inventions developed by the present inventors. These other inventions may require additional data fields than those used by the flow charts of the present invention and accordingly, not all of the fields disclosed in every data structure may be necessary to construct the present invention. Further, the SPDL standard is still in draft form and evolving. Accordingly, some of the data structures which have been created may have fields which are no longer necessary because of the changing of the standard or exist because of the possibility of the changing of the standard.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of changing a format of a file, comprising the steps of:
    inputting a binary file;
    converting an element of the binary file to a textual format;
    writing the textual format of the element into a first buffer;
    ascertaining if an attribute is required for the element;
    determining if a sub-element of the binary file is an attribute of the element or if the sub-element is not an attribute of the element;
    converting the sub-element to the textual format;

when the sub-element is determined not to be an attribute of the element and an attribute is ascertained to be required for the element, performing the steps of:
writing the textual format of the sub-element of the element into a second buffer;
processing the binary file until the required attribute is encountered;
converting the required attribute to the textual format;
writing the textual format of the required attribute into the first buffer containing the element;
when the sub-element is determined to be an attribute and an attribute is ascertained to be required for the first element, performing the step of:
writing the textual format of the sub-element into the first buffer.

2. A method according to claim 1, wherein:
said step of writing the textual format of the sub-element of the element into a second buffer writes the textual format of the sub-element of the element into the second buffer which refers to the first buffer, and
said method further comprising, performed after the sub-element is determined not to be an attribute of the element, the step of:
tracing back from the second buffer to locate the first buffer, before performing said step of writing the textual format of the required attribute into the first buffer containing the element.

3. A method according to claim 1, wherein said second buffer is a double linked-list referring back to the first buffer and forward to a subsequent buffer and wherein:
said step of writing the textual format of the sub-element into the second buffer writes the textual format of the sub-element into the double linked list,
said method further comprising, performed after the sub-element is determined not to be an attribute of the element, the step of:
tracing back from the double linked list to locate the first buffer, before performing said step of writing the textual format of the required attribute into the first buffer containing the element.

4. An apparatus for changing a format of a file, comprising:
means for inputting a binary file;
means for converting an element of the binary file to a textual format;
means for writing the textual format of the element into a first buffer;
means for ascertaining if an attribute is required for the element;
means for determining if a sub-element of the binary file is an attribute of the element or if the sub-element is not an attribute of the element;
means for converting the sub-element to the textual format;
means for writing the textual format of the sub-element of the element into a second buffer, when the sub-element is determined not to be an attribute of the element and an attribute is ascertained to be required for the element;
means for processing the binary file until the required attribute is encountered, when the sub-element is determined not to be an attribute of the element and an attribute is ascertained to be required for the element;
means for converting the required attribute to the textual format, when the sub-element is determined not to be an attribute of the element and an attribute is ascertained to be required for the element;
means for writing the textual format of the required attribute into the first buffer containing the element, when the sub-element is determined not to be an attribute of the element and an attribute is ascertained to be required for the element; and
means for writing the textual format of the sub-element into the first buffer, when the sub-element is determined to be an attribute and an attribute is ascertained to be required for the first element.

5. An apparatus according to claim 4, wherein:
said means for writing the textual format of the sub-element of the element into the second buffer writes the textual format of the sub-element of the element into the second buffer which refers to the first buffer, and
said apparatus further comprises:
means for tracing back from the second buffer to locate the first buffer, before performing said step of writing the textual format of the required attribute into the first buffer containing the element, after the sub-element is determined not to be an attribute of the element.

6. An apparatus according to claim 4, wherein said means for writing the textual format of the sub-element of the element into the second buffer writes the textual format of the sub-element of the element into said second buffer which is a double linked-list referring back to the first buffer and forward to a subsequent buffer, and wherein:
said apparatus further comprises:
means for tracing back from double linked list to locate the first buffer, before performing said step of writing the textual format of the required attribute into the first buffer containing the element, after the sub-element is determined not to be an attribute of the element.

7. A method of changing a format of a file, comprising the steps of:
inputting a binary file;
converting an element of the binary file to a textual format;
writing the textual format of the element into a first buffer;
determining if a sub-element of the element of the binary file is a permissible sub-element of the element or if the sub-element is an impermissible sub-element of the element by tracing through data structures containing permissible sub-elements of the element;
indicating an error when the sub-element is determined to be an impermissible sub-element of the element; and
converting subsequent portions of the binary file to the textual format when the sub-element is determined to be an impermissible sub-element of the element.

8. A method according to claim 7, wherein said determining step determines if the sub-element of the element is a permissible sub-element of the element or if the sub-element is an impermissible sub-element by tracing through sub-element linked list data structures which each contain a permissible sub-element of the element, the sub-element is determined to be permissible if the sub-element is found within said linked list data structure and the sub-element determined to be impermissible when the sub-element is not found in said sub-element linked list data structures.

9. An apparatus for changing a format of a file, comprising:
means for inputting a binary file;

means for converting an element of the binary file to a textual format;

means for writing the textual format of the element into a first buffer;

means for determining if a sub-element of the element of the binary file is a permissible sub-element of the element or if the sub-element is an impermissible sub-element of the element by tracing through data structures containing permissible sub-elements of the element;

means for indicating an error when the sub-element is determined to be an impermissible sub-element of the element; and means for converting subsequent portions of the binary file to the textual format when the sub-element is determined to be an impermissible sub-element of the element.

10. A method according to claim 9, wherein said means for determining determines if the sub-element of the element is a permissible sub-element of the element or if the sub-element is an impermissible sub-element by tracing through sub-element linked list data structures which each contain a permissible sub-element of the element, the sub-element is determined to be permissible if the sub-element is found within said linked list data structure and the sub-element determined to be impermissible when the sub-element is not found in said sub-element linked list data structures.

11. A method of changing a format from binary to textual of an indefinite length encoding having a definite length encoding nested therein, both the indefinite length encoding and the definite length encoding containing preamble information and content information, comprising the steps of:

inputting a binary file;

processing the preamble information of the indefinite length encoding and converting a binary representation of the preamble information of the indefinite length encoding to a textual representation;

processing the content information of the indefinite length encoding which contains the definite length encoding, by performing the steps of:

processing the preamble information of the definite length encoding to determine a number of bytes of content information of the definite encoding, and;

processing the content information of the definite length encoding by processing bytes until the number of the bytes of the content information of the encoding have been processed without determining whether a marker indicating an end of the indefinite length encoding exists in the encoding by converting a binary representation of the content information of the definite length encoding to a textual representation;

examining bytes of the indefinite length encoding after the content information of the definite length encoding for a marker indicating an end of the indefinite length encoding, after processing the content information of the definite length encoding; and terminating the processing of the indefinite length encoding if bytes after the content information of the definite length encoding indicate an end of the indefinite length encoding.

12. A method according to claim 11, further comprising the step of:

processing the bytes subsequent to the definite length encoding as a subsequent nested procedure within the indefinite length encoding if the bytes subsequent to the content information of the definite length encoding do not indicate an end of the indefinite length encoding.

13. A method of changing a format from binary to textual of an indefinite length encoding having a definite length encoding nested therein, both the indefinite length encoding and the definite length encoding containing preamble information and content information, comprising the steps of:

processing the preamble information of the indefinite length encoding and converting a binary representation of the preamble information to a textual representation;

processing the content information of the indefinite length encoding which contains the definite length encoding, by performing the steps:

processing preamble information of the definite length encoding to determine a number of bytes of content information of the definite encoding, and storing the number of bytes of the content information of the definite encoding in a temporary storage means, and converting a binary representation of the definite length encoding to a textual representation, and;

processing the content information of the definite length encoding by processing bytes until the number of bytes of content information stored in the temporary storage means have been processed without determining whether a marker indicating an end of the indefinite length encoding exists in the encoding, and as the content information of the definite length encoding is being processed, counting in said temporary storage means, the number of bytes of the definite length encoding which have been processed;

examining bytes of the encoding after the content information of the definite length encoding for bytes indicating an end of the indefinite length encoding, after processing the content information of the definite length encoding; and terminating the processing of the indefinite length encoding if bytes subsequent to the contents of the definite length encoding indicate an end of the indefinite length encoding.

14. A method according to claim 13, wherein the step of storing the number of bytes of the content information of the definite length encoding pushes the length information onto a stack; and the step of processing the content information of the definite length encoding processes bytes until the number of bytes of content on the stack have been processed without determining whether a marker indicating an end of the indefinite length encoding exists in the encoding, and as the content information of the definite length encoding is being processed, counting in said stack, the number of bytes of the definite length encoding which have been processed.

15. A method of changing a format from binary to textual of a first definite length encoding having an indefinite length encoding nested therein, the indefinite length encoding having nested therein a second definite length encoding, the indefinite length encoding and the first and second definite length encodings each containing preamble information and content information, comprising the steps of:

processing the preamble information of the first definite length encoding and converting the preamble information from a binary representation to a textual representation;

processing the content information of the first definite length encoding by performing the steps of:

processing the preamble information of the indefinite length encoding and as the preamble information of the indefinite length encoding is being processed, counting in a first entry in a storage means, the number of bytes of the preamble information of the indefinite length encoding which have been processed, and converting the preamble information of the indefinite length encoding from a binary representation to the textual representation;

processing the content information of the indefinite length encoding, by performing the steps of:

processing the preamble information of the second definite length encoding to determine a number of bytes of the content information of the second definite length encoding and storing in a second entry of the temporary storage means, the number of bytes of the content information of the second definite encoding, and as the preamble information of the second definite length encoding is being processed, counting in the first entry of the temporary storage means, the number of bytes of the second definite length encoding which have been processed, converting a binary representation of the second definite length encoding to the textual representation, and;

processing the content information of the second definite length encoding by processing the second definite length encoding until the number of bytes of content information of the second definite length encoding have been processed without determining whether a marker indicating an end of the indefinite length encoding exists in the encoding, and as the content information of the second definite length encoding is being processed, counting in said second entry of the temporary storage means, the number of bytes of the definite length encoding which have been processed;

examining bytes of the encoding after the content information of the second definite encoding for bytes indicating an end of the indefinite length encoding, after processing the content information of the second definite length encoding;

terminating the processing of the indefinite length encoding, if bytes subsequent to the content information of the second definite length encoding indicate an end of the indefinite length encoding; and processing subsequent bytes of content of the first definite length encoding until all bytes of the first definite length encoding have been processed.

* * * * *